US010237957B2

(12) United States Patent
Green et al.

(10) Patent No.: US 10,237,957 B2
(45) Date of Patent: *Mar. 19, 2019

(54) METHOD FOR AUTOMATICALLY MAPPING LIGHT ELEMENTS IN AN ASSEMBLY OF LIGHT STRUCTURES

(71) Applicant: Symmetric Labs, Inc., San Francisco, CA (US)

(72) Inventors: Alexander Green, San Francisco, CA (US); Kyle Fleming, San Francisco, CA (US)

(73) Assignee: Symmetric Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,688

(22) Filed: Mar. 1, 2018

(65) Prior Publication Data

US 2018/0192497 A1 Jul. 5, 2018

Related U.S. Application Data

(63) Continuation of application No. 15/445,911, filed on Feb. 28, 2017, now Pat. No. 9,942,970.

(Continued)

(51) Int. Cl.
*H05B 37/02* (2006.01)
*H05B 33/08* (2006.01)
(Continued)

(52) U.S. Cl.
CPC ............. *H05B 37/029* (2013.01); *G06T 7/74* (2017.01); *H04N 7/18* (2013.01);
(Continued)

(58) Field of Classification Search
CPC .... H05B 37/029; H05B 33/0869; G06T 7/70; G06T 2207/10016; G06T 2207/20224; H04N 7/18
See application file for complete search history.

(56) References Cited

U.S. PATENT DOCUMENTS

2009/0051624 A1* 2/2009 Finney ................ H05B 37/029
345/30
2010/0301776 A1* 12/2010 Feri .................... H05B 37/0272
315/312

(Continued)

*Primary Examiner* — Douglas W Owens
*Assistant Examiner* — Raymond R Chai
(74) *Attorney, Agent, or Firm* — Run8 Patent Group, LLC; Peter Miller

(57) ABSTRACT

One variation of a method for automatically mapping light elements in light structures arranged in an assembly includes: defining a sequence of test frames—each specifying activation of a unique subset of light elements in the assembly—executable by the set of light structures; serving the sequence of test frames to the assembly for execution; receiving photographic test images of the assembly, each photographic test image recorded during execution of one test frame by the assembly; for each photographic test image, identifying a location of a particular light element based on a local change in light level represented in the photographic test image, the particular light element activated by the set of light structures according to a test frame during recordation of the photographic test image; and aggregating locations of light elements identified in photographic test images into a virtual map representing positions of light elements within the assembly.

20 Claims, 8 Drawing Sheets

Related U.S. Application Data

(60) Provisional application No. 62/424,523, filed on Nov. 20, 2016, provisional application No. 62/301,581, filed on Feb. 29, 2016.

(51) Int. Cl.
*H04N 7/18* (2006.01)
*G06T 7/73* (2017.01)

(52) U.S. Cl.
CPC .................. *H05B 33/0869* (2013.01); *G06T 2207/10016* (2013.01); *G06T 2207/20224* (2013.01)

(56) References Cited

U.S. PATENT DOCUMENTS

2017/0019979 A1* 1/2017 Ghanoun .............. H05B 37/034
2017/0231066 A1* 8/2017 Roberts .............. H05B 33/0845

* cited by examiner

METHOD FOR AUTOMATICALLY MAPPING LIGHT ELEMENTS IN AN ASSEMBLY OF LIGHT STRUCTURES

CROSS-REFERENCE TO RELATED APPLICATIONS

This Application is a continuation application of U.S. application Ser. No. 15/445,911, filed on 28 Feb. 2017, which claims priority to U.S. Provisional Application No. 62/301,581, filed on 29 Feb. 2016, and to U.S. Provisional Application No. 62/424,523, filed on 20 Nov. 2016, all of which are incorporated in their entireties by this reference.

TECHNICAL FIELD

This invention relates generally to the field of lighting systems and more specifically to a new and useful method for automatically mapping light elements in an assembly of light structures in the field of lighting systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
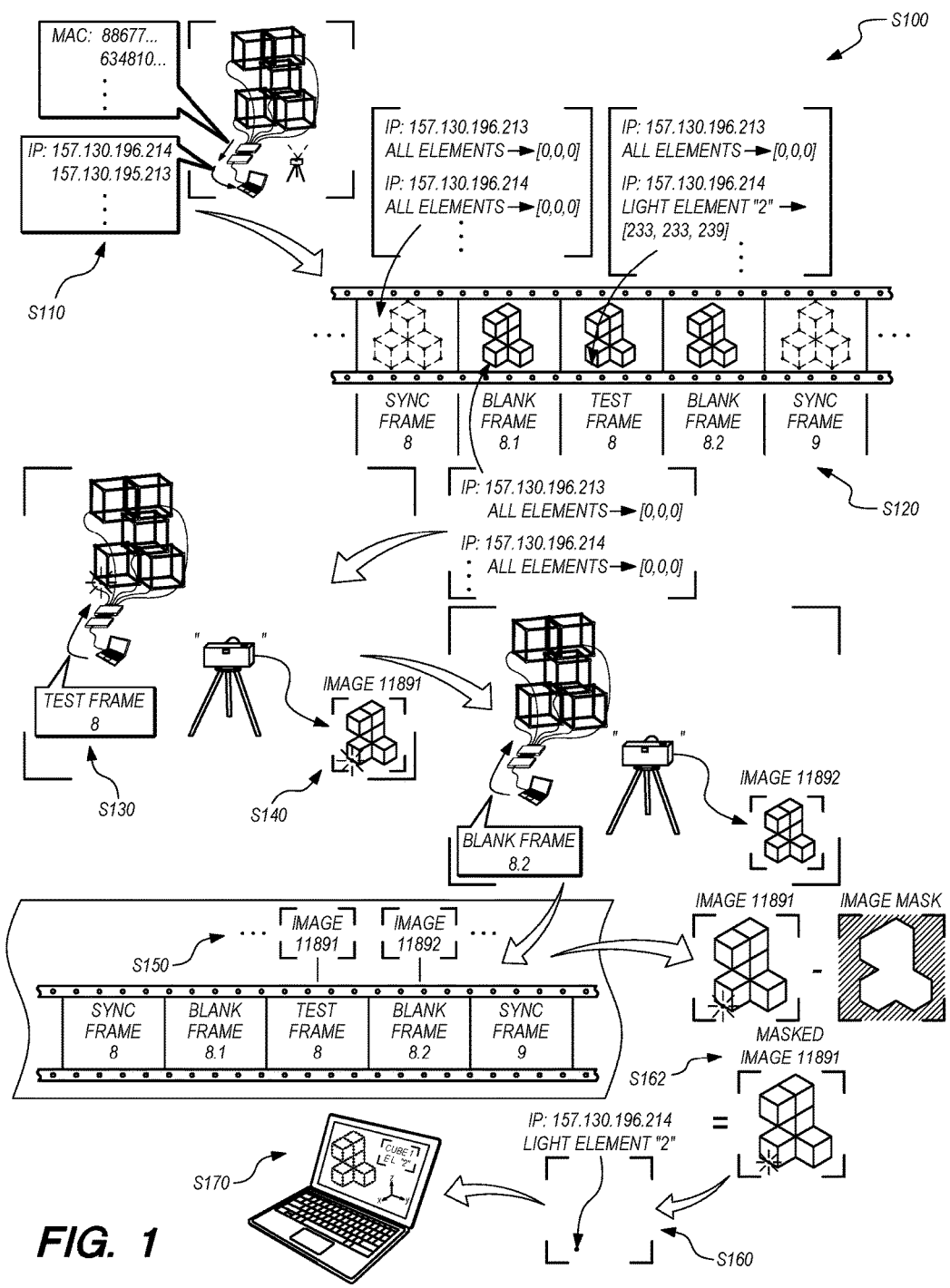
FIG. 1 is a flowchart representation of a method.

As shown in FIG. 1, a method S100 for automatically mapping light elements in an assembly of light structures includes: retrieving addresses from light structures in the assembly in Block S110; and, based on addresses retrieved from light structures in the assembly in Block S120, generating a sequence of test frames including a reset frame specifying activation of multiple light elements in light structures across the assembly, a set of synchronization frames succeeding the reset frame and specifying activation of light elements in light structures across the assembly, a set of pairs of blank frames interposed between adjacent synchronization frames and specifying deactivation of light elements in light structures across the assembly, and a set of test frames interposed between adjacent blank frame pairs, each test frame in the set of test frames specifying activation of a unique subset of light elements in light structures within the assembly. The method S100 also includes, during a test period: transmitting the sequence of test frames to light structures in the assembly in Block S130; and at an imaging system, capturing a sequence of images of the assembly in Block S140. Furthermore, the method S100 includes: aligning the sequence of test frames to the sequence of images based on the reset frames, the set of synchronization frames, and values of pixels in images in the sequence of images in Block S150; for a particular test frame in the set of test frames, determining a position of a light element, addressed in the particular test frame, within a particular image, in the sequence of images, corresponding to the particular test frame based on values of pixels in the particular image in Block S160; and aggregating positions of light elements determined in images in the sequence of images into a virtual 3D map of positions and addresses of light elements within the assembly in Block S170.

Figure 4:
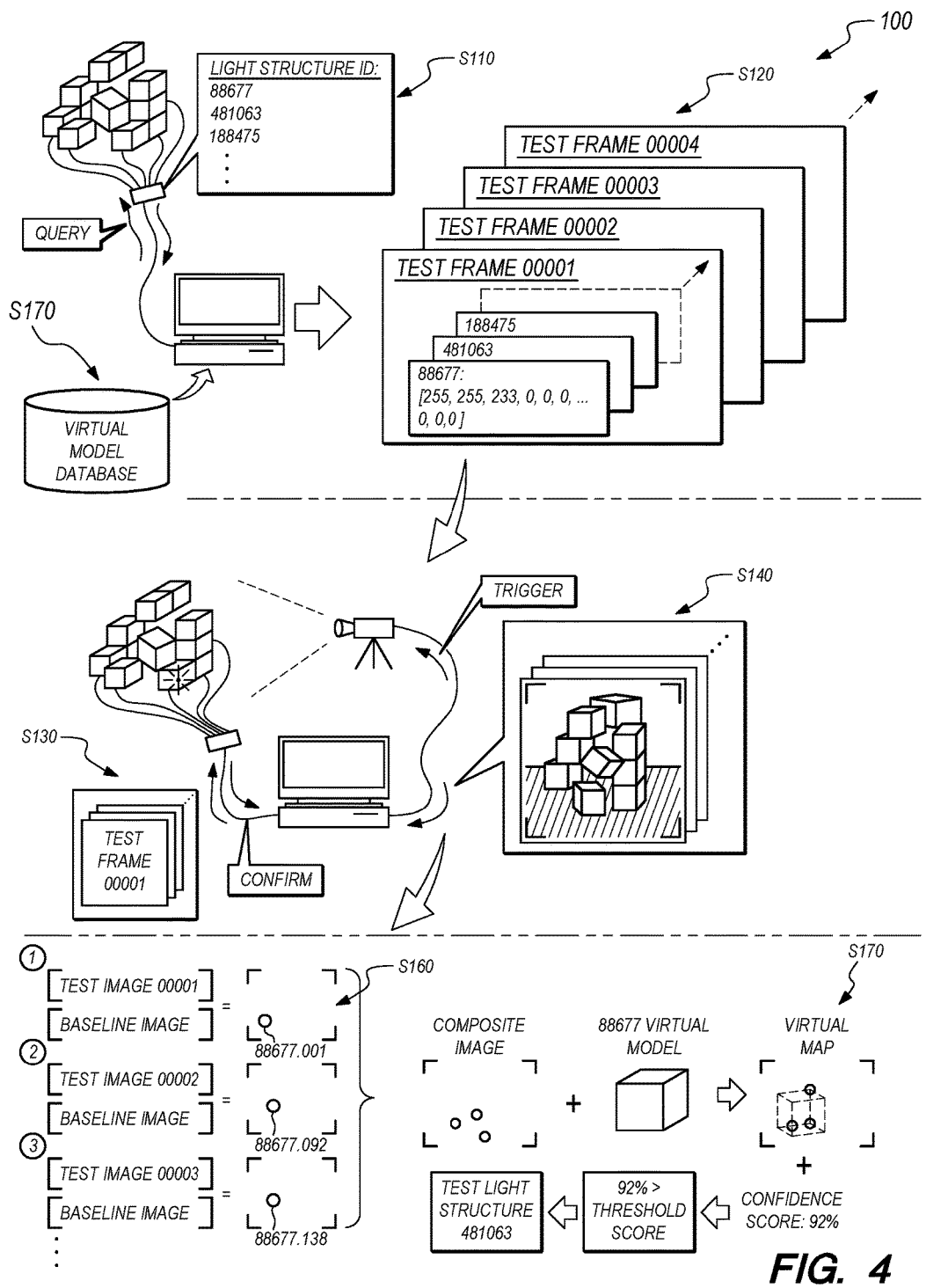
FIG. 4 is a flowchart representation of one variation of the method.

As shown in FIG. 4, one variation of the method S100 includes: reading an address from each light structure in the set of light structures in Block S110; defining a sequence of test frames executable by the set of light structures in Block S120, each test frame in the sequence of frames specifying activation of a unique subset of light elements across the set of light structures; serving the sequence of test frames to the assembly for execution by the set of light structures in Block S130; receiving a set of photographic test images of the assembly in Block S140, each photographic test image in the set of photographic test images recorded by an imaging system during execution of one test frame, in the sequence of test frames, by the set of light structures; for each photographic test image in the set of photographic test images, identifying a location of a particular light element within a field of view of the imaging system based on a local change in light level represented in the photographic test image in Block S160, the particular light element activated by the set of light structures according to a test frame in the sequence of test frames during recordation of the photographic test image; and aggregating locations of light elements identified in the set of photographic test images into a virtual map representing positions of light elements within the assembly in Block S170.

2. Applications

Generally, the method S100 can be executed by a computer system in conjunction with an assembly of one or more light structures including one or more light elements in order to automatically determine a position of each light element in the assembly in real space and to construct a 3D virtual map of the assembly. In particular, a set of light structures can be assembled into a unique assembly, such as on a theater or performing arts stage and connected to the computer system; the computer system can then generate a sequence of test frames in which each test frames specified activation of a unique subset light elements (e.g., one unique light element) in the assembly, sequentially serve the sequence of test frames to the assembly for execution while a camera in a fixed position records photographic test images of the assembly, identifies positions of light elements in the field of view of the camera based on differences in lighted areas between photographic test images or between photographic test images and a baseline image, and compiles these positions of light elements in the field of view of the camera into a virtual 3D representation of the assembly, including relative positions and subaddresses of each light element.

In the foregoing example, during setup the computer system can read addresses from each light structure in the assembly in Block S110, retrieve a virtual model of each light structure based on its address in Block S170, and align a virtual model of a light structure to light elements—in the same light structure—identified in photographic test images recorded by the camera to a location in the visual model in the virtual map in Block S60. Alternatively, the computer system can serve two sequences of test frames to the assembly, including a first sequence while the camera is arranged in a first location, and a second sequence while the camera is arranged in a second location offset from the first location; the computer system can then compile detected positions of light elements in two separate sets of photographic test images and a known distance between the first and second locations into a 3D virtual map of the assembly.

Figure 2:
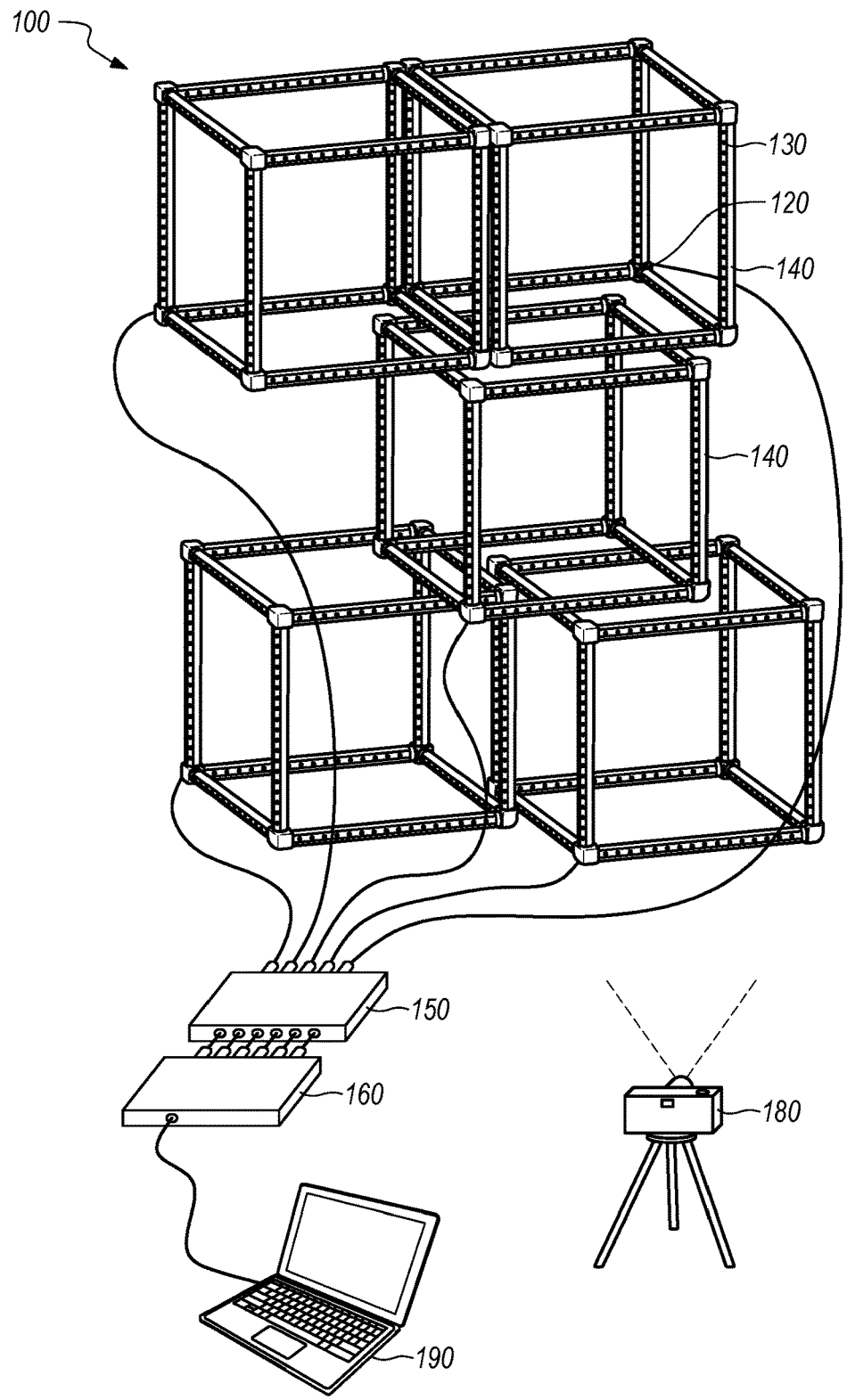
FIG. 2 is a schematic representation of a system.

With a virtual map of the assembly thus constructed, the computer system can project a new or preexisting dynamic virtual light pattern onto the virtual 3D map of the assembly and generate a sequence of replay frames that, when executed by the assembly, recreate the dynamic virtual light pattern in real space. For example, a lighting crew can assemble a set of dozens or hundreds of one-meter-cubic light structures, as shown in FIG. 2, on a stage according to a custom assembly geometry without regard to the orientation of these light structures and then connect these light structures to a router without regard to order of the light structures. Once the assembly is complete and connected to the computer system via the router, the computer system can execute Blocks of the method S100 to automatically construct a virtual map of the assembly. In this example, a lighting engineer can then select a predefined virtual light pattern, customize an existing virtual light pattern, code a new virtual light pattern, or string together multiple virtual light patterns into a composite virtual light pattern through a user interface executing on the computer system. Once a virtual light pattern is selected, the computer system can scale, translate, and rotate the pattern in three dimensions in order to locate the virtual light pattern on the virtual map and generate a sequence of replay frames, wherein each replay frame assigns a color value to each light element in the assembly according to a 3D color pattern defined by the light pattern at one instance within a duration of the predefined dynamic light pattern.

The computer system can therefore execute Blocks of the method S100 to automatically generate a virtual map of a custom assembly of light structures, to automatically project a virtual dynamic 3D light pattern onto the virtual map, and to automatically define a sequence of replay frames that—when executed on the assembly—recreate the virtual dynamic 3D light pattern in real space without necessitating (substantial) consideration of light structure addresses or orientations during construction of the assembly or manual configuration of the virtual map within the user interface.

As shown in FIG. 2, the method S100 can be implemented by a system 100 including one or more light structures 110 forming an assembly of light structures, a computer system 190 (e.g., a remote controller), a power supply 150, a router 160, and/or an imaging system 180 (such as a camera), etc.

3. Light Structure

Figure 3A:
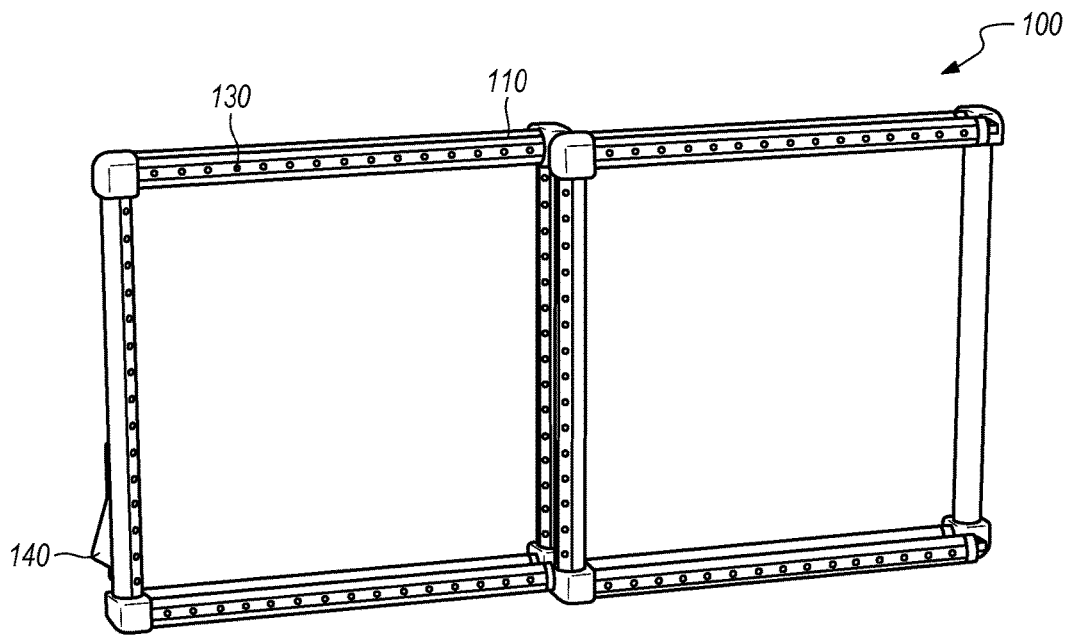
FIGS. 3A, 3B, 3C, and 3D are schematic representations of one variation of the system.
Figure 3B:
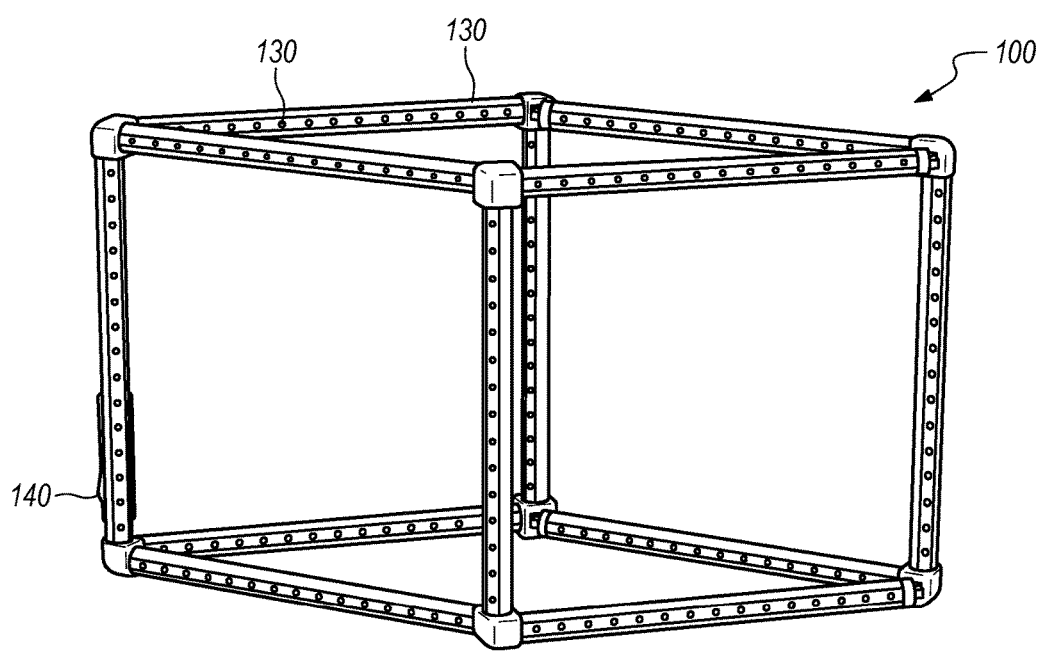
Figure 3C:
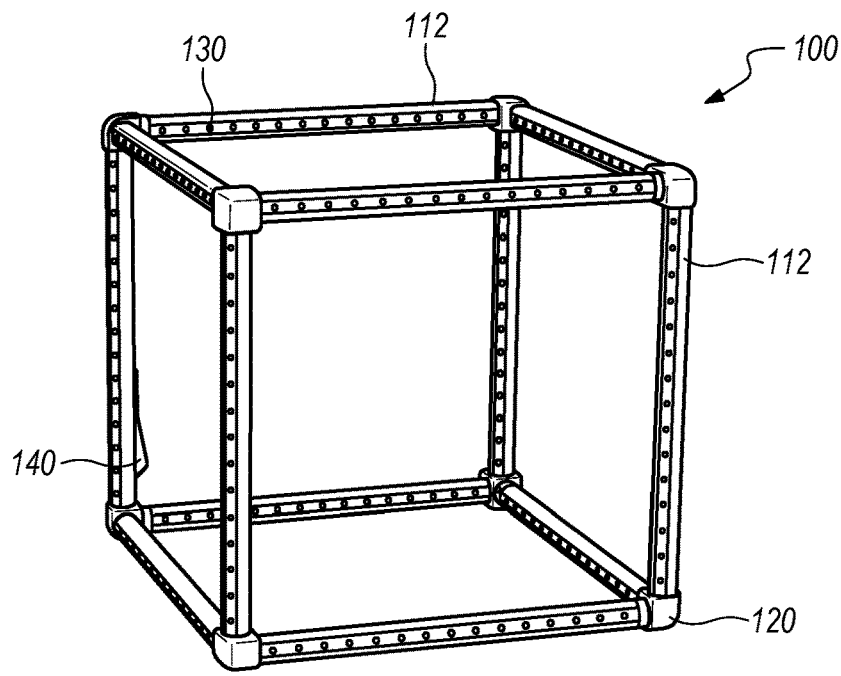

In one implementation, a light structure 110 defines an open cubic structure (a "light cube") including: twelve linear beams 112 that define the twelve edges of the light cube; eight corner elements 120 that each receive three perpendicular linear beams 112 to define the eight corners of the light cube; and a single chain of light elements 130 (e.g., 180 LEDs) arranged along each linear beam in the light cube, as shown in FIGS. 2, 3B, and 3C.

3.1 Light Element

In this implementation, each light element 130 can include one or more light emitters, as shown in FIGS. 3B and 3C. For example, each light element 130 can include a discrete red emitter, a discrete green emitter, and a discrete blue emitter packaged in a single light element 130 housing. In this example, each red, green, and blue emitter can be independently powered (e.g., from 0% power to 100% in 256 steps) in order to achieve a wide range of color outputs from the light element 130 (e.g., ~16.8M colors). Furthermore, each light element 130 can be independently addressable and can be assigned a color value independent of other light elements in the chain. As in the foregoing example, during a first frame (e.g., a frame 0.2-second in duration), a light element 130 in the chain can be assigned a color value [0, 0, 0], or "OFF." In this example, during a second, subsequent frame, the light element 130 can be assigned a color value [255, 255, 255], or "white" at full (gamma-corrected) brightness. Furthermore, in this example, during a third frame, the light element 130 can be assigned a color value [0, 255, 255], or "cyan" at full brightness. During a fourth frame, the light element 130 can be assigned a color value [0, 127, 127], or "cyan" at 50% (gamma-corrected) brightness.

3.2 Local Controller

In this implementation, each light element 130 can include a local controller that: receives a string (or array) of color values for light elements in the chain from a preceding light element 130 (or, for the first light element 130 in the chain, from the control module 140 described below); strips its assigned color value from the string (or array) of color values; passes the remaining portion of the string (or array) of color values to a subsequent light element 130; and implements its assigned color value, such as immediately or in response to a trigger (e.g., a clock output), for each frame during operation of the light structure 110. For example, the local controller can set a duty cycle for each color emitter in its corresponding light element 130, such as from 0% to 100% duty in 256 increments, based on color values received from the control module 140 in order to achieve a color output from the light element 130 as specified by the control module 140 for the current frame. For a subsequent frame, the control module 140 can pass a new array of color values to the chain of light elements, and each light element 130 can repeat the foregoing methods and techniques to output colored light according to a color value specified by the control module 140 for the subsequent frame. In a similar implementation, the light structure 110 includes multiple discrete chains of light elements, wherein each chain and/or each light element 130 in each chain is independently addressable with a color value. Each chain and/or each light element 130 in each chain can thus implement the foregoing methods and techniques to output colored light according to a color value specified by the control module 140.

In one implementation, the computer system 190 described below generates one array of color values per light structure 110 per replay frame, wherein each array includes one color value per light element 130 in its corresponding light structure 110. In this implementation, each color value represents both an hue and a brightness of light output by the corresponding light element 130 during execution of the replay frame. For example, for a light structure 110 that includes a chain of 180 light elements connected in series and for which each light element 130 contains three color elements (e.g., a red (R), a green (G), and a blue (B) color elements), the computer system 190 can output one array in the form of $[R_0, G_0, B_0, R_1, G_1, B_1, R_2, G_2, B_2, R_3, G_3, B_3, \ldots R_{178}, G_{178}, B_{178}, R_{179}, G_{179}, B_{179}]$ to the light structure 110 per replay frame. In this implementation, when a local controller of a first light element 130 in the chain receives a new array from the computer system 190, the local controller can: strip the first three values from the array; set a brightness of the red component of the light element 130 according to the first stripped value; set a brightness of the green component of the light element 130 according to the second stripped value; set a brightness of the blue component of the light element 130 according to the third stripped value; and pass the remainder of the array to a next light element 130 in the chain within the light structure 110. Upon receipt of the revised array, a local controller of a second light element 130 in the chain can implement similar methods and techniques to update RGB components in its light element 130, to again revise the array, and to pass the revised array to a next light element 130 in the chain; etc. until the array reaches and is implemented by the final light element 130 in the chain.

Alternatively, the first local controller can read a color value—from the array—at array positions predefined for the first light element 130, implement this color value, and pass the complete array to the next light element 130 in the chain.

Yet alternatively, the computer system 190 described below can generate a set of three arrays of color values (e.g., red, green, and blue arrays) per light structure 110 per replay frame, wherein each set of arrays includes one color value in one color channel (e.g., red, green, or blue) per light element 130 in its corresponding light structure 110. In this implementation, each color value represents a brightness of one component of a corresponding light element 130 for the replay frame. Upon receipt of a set of arrays from the computer system 190, local controllers at light elements in a light structure 110 can implement methods and techniques described above to read color values from this set of arrays and to update components of light elements in the light structure 110 according to these color values.

The computer system 190 and chains of light elements and local controllers across an assembly of light structures can repeat this process for a sequence of replay frames—such as at a preset frame rate (or "refresh rate," such as 20 Hz, 200 Hz, or 400 Hz)—during playback of a lighting pattern, as described below.

3.3 Control Module

The light structure 110 also includes a control module 140 connected to the chain of light elements and configured to interface with the computer system 190 as shown in FIGS. 3B and 3C. In one implementation, the control module 140 is preloaded with a unique ID. In one example, the unique ID defines a MAC address (or IP address) that includes: a pseudorandomly assigned or serialized UUID segment; and additional data, such as a light element 130 configuration (e.g., a number of light elements, an offset distance between light elements), a power limit of the light structure 110 (e.g., 25 W, 100 W), a light structure 110 configuration (e.g., point light source, cubic light structure 110, tetrahedral light structure 110), and/or a make or model of the light structure 110; etc. The computer system 190 or router 160 can thus read these data from the control module 140 directly. Alternatively, the control module 140 can be loaded with a pseudorandomly assigned or serialized MAC address, and any of the foregoing data can be stored in a remote database and linked to the MAC address of the light structure 110 via a domain name system (DNS).

3.4 Buffer

In one implementation, a control module 140 within a light structure 110 includes a buffer in local memory and writes multiple arrays received from the computer system 190 —via the router 160—to this buffer. During operation, the control module 140 can push an oldest array in the buffer to the first light element 130 in the chain at a regular interval, such as at a preset frame rate (or "refresh rate", such as 20 Hz, 200 Hz, or 400 Hz) and then delete this last array from the buffer once distributed to the chain of light elements. Furthermore, once the buffer is filled, the control module 140 can delete an oldest array from the buffer upon receipt of a new array from the computer system 190 in order to maintain synchronicity between light structures in one assembly of light structures to within a maximum time spanned by the buffer.

In this implementation, the control module 140 can implement a buffer of size based on (e.g., directly proportional to) the frame rate implemented by the system. For example: for a frame rate of 20 fps (e.g., a refresh rate of 20 Hz), the control module 140 can implement a buffer configured to store five arrays; for a frame rate of 100 fps (e.g., a refresh rate of 100 Hz), the control module 140 can implement a buffer configured to store ten arrays; and, for a frame rate of 400 fps (e.g., a refresh rate of 400 Hz), the control module 140 can implement a buffer configured to store fifty arrays.

3.5 Communication Port

The light structure 110 also includes a communication port and receptacle (e.g., an Ethernet port) that receives power and control signals from the computer system 190, such as in the form of an array of color values for each light element 130 in the light structure 110. The control module 140 can also transmit its assigned MAC address (or IP address or other locally-stored ID), confirmation of receipt of an array (or array) of color values, confirmation of implementation of an array of color values across light elements in the light structure 110, and/or any other data to the computer system 190 (e.g., via the router 160) over the communication port.

3.6 Light Structure Assembly

Multiple light structures can be constructed into an assembly of light structures. For example, multiple light structures can be mounted (e.g., clamped) to a truss and/or stacked and mounted to other light structures.

Figure 3D:
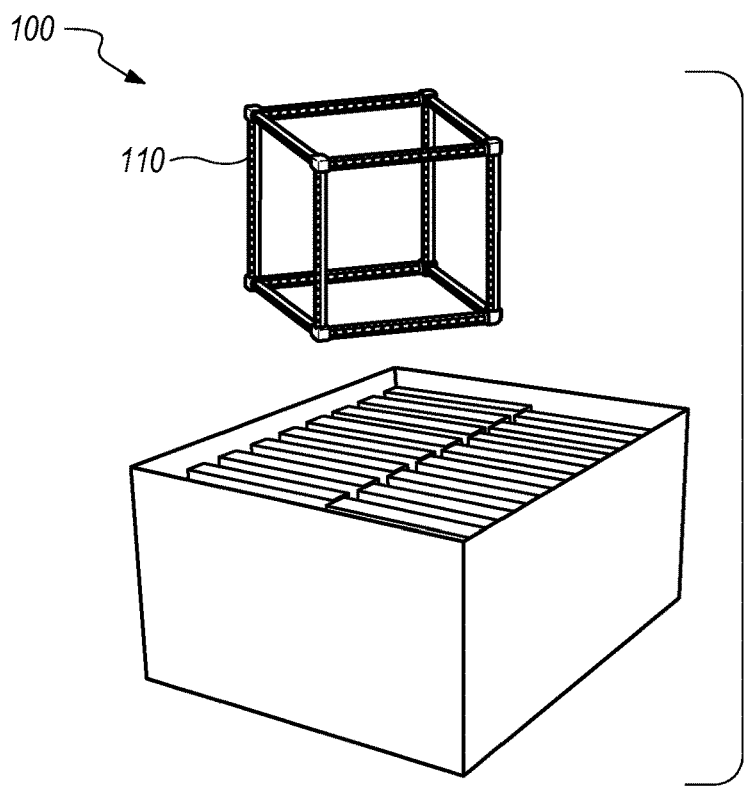

The method S100 is described herein as interfacing with and automatically generating a virtual map of one or more light cubes. However, the method S100 can interface with and generate a virtual map of any other one-, two-, or 3D light structures or combinations of light structures of various types, such as a point light source, a linear light structure (shown in FIG. 7), a cubic light structure 110, or a tetrahedral light structure 110, etc. Each light structure 110 can also be foldable, such as to pack flat and nest with other like light structures, as shown in FIGS. 3A and 3D.

4. Computer System

Blocks of the method S100 are described herein as executed by a computer system 190, such as a computer system 190 integrated into or external to the assembly of light structures. For example, the computer system 190 can include a laptop computer (shown in FIG. 2), a desktop computer, a smartphone, a tablet, a remote server, or any other one or combination of local, remote, and/or distributed computing devices. Blocks of the method S100 are described herein as executed by a remote control external but local to the assembly of light structures. However, Blocks of the method S100 can be executed by any other one or more local or remote computer systems.

Generally, the computer system 190 can aggregate arrays of colors values addressed to specific light structures in the assembly into a frame that can then be loaded into and executed by the assembly. For example, the computer system 190 can generate frames of a lighting sequence for the light structure 110 assembly by mapping one or more standard lighting sequence modules onto a 3D representation of the light structure 110 assembly, as described below. The mobile computing device can then feed these frames—including arrays of color values addressed to one or more light structures within the assembly—to the assembly in order to realize the lighting sequence, such as during a show, act, gig, exhibit, or other performance.

However, because a group of light structures may be assembled into a custom assembly and because groups of light structures may not be identically ordered or oriented when assembled, dismantled, and reassembled (e.g., between venues), the computer system 190 can execute Blocks of the method S100, as described below, to: automatically generate a virtual 3D representation (hereinafter a "virtual map") of an assembly of one or more light structures; and to automatically map a predefined lighting sequence template, lighting sequence module, or complete lighting sequence to the virtual 3D representation of the light structure 110 assembly. In particular, the computer system 190 can therefore execute Blocks of the method S100 prior to implementation of a lighting sequence at the light structure 110 assembly in order to automatically determine positions and orientations of a group of light structures—and therefore the positions and orientations of each light element 130 in each light structure 110—in a light structure 110 assembly. The computer system 190 can therefore execute Blocks of the method S100 retroactively such that a group of light structures can be assembled without tedious attention to order or orientation, such that a human operator need not manually reprogram or modify a predefined light sequence for a current assembly of light structures, and such that an operator need not manually map a predefined light sequence to each light element 130 in each light structure 110 in the current assembly.

5. Router

As shown in FIG. 2, the system can also include a router 160 interposed between the mobile computing device and the assembly of light structures. The router 160 can be connected to each light structure 110 via wired connections, such as via one category-5 cable extending from the communication port on a light structure 110 to a corresponding port in the router 160 for each light structure 110 in the assembly. Alternatively, all or a subset of light structures in the assembly can be connected in serial (e.g., "daisy-chained") and connected to a single port in the router 160 via a wired connection. The router 160 can also assign an IP address (or other interface identification and location addressing label) to each light structure 110 in the assembly. For example, when an assembly of light structures is completed and first powered on, the router 160 can read a MAC address (or other identifier) from each light structure 110 in the assembly, assign a static IP address to each received MAC address, populate a DNS with MAC address and IP address pairs, and pass a list of these IP addresses (or the complete DNS value pairs) to the computer system 190.

During operation, such as during an automatic mapping cycle (described below) or later during execution of a lighting sequence, the router 160 receives frames —including an array of color values and light structure 110 identifiers (e.g., IP address) for each light structure 110 in the assembly—from the computer system 190, such as over a single wired or wireless connection. Upon receipt of a frame from the computer system 190, the router 160 distributes each array of color values in the frame to its corresponding light structure 110 via a port in the router 160 connected (e.g., wired) to and assigned an IP address associated with the corresponding light structure 110; light structures in the assembly then distribute color value assignments in their received color value arrays to corresponding light elements, and light elements across the assembly implement their respective color values, such as immediately or in response to a next clock value, flag, or interrupt transmitted from the router 160. For example, the computer system 190, router 160, light structures, and light elements can cooperate to implement a frame rate of 5 Hz (i.e., the computer system 190, router 160, light structures, and light elements can cooperate to execute a new frame once every 0.2 second).

In one implementation, the router 160 receives one packet of arrays (or a "replay frame") from the computer system 190 per update period, such as at a rate of 20, 200, or 400 frames per second over 2 MHz serial connection to the computer system 190. The router 160 can then funnel each array to its corresponding light structure 110. For example, at startup (e.g., when the router 160 is first powered on following connection to an assembly of light structures) the router 160 can read a MAC address (or other identifier) from each connected light structure 110 and then generate a lookup table linking one MAC address to one port of the router 160 for the current light structure 110-router 160 configuration based on the port address from which each MAC address was received. When generating a new replay frame, the computer system 190 can assign a MAC address (or IP address or other identifier) to each array in the replay frame based on results of the automatic mapping cycle described below. Upon receipt of a new replay frame from the computer system 190, the router 160 can access the lookup table and funnel each array in the replay frame through a port associated with the MAC address of its corresponding light structure 110, such as via user datagram protocol (UDP) packets.

6. Power Supply

In one implementation, the system also includes an external power supply 150, such as a power over Ethernet (PoE) switch interposed between each light structure 110 (or each chain of light structures) and a corresponding port in the router 160, as shown in FIG. 2. In this implementation, the power supply 150 can add a DC power signal to an AC data signal received from the router 160 and pass this combined power-data signal to a corresponding light structure 110.

Alternatively, the system can include one or more discrete power supplies separately wired to light structures in the assembly. A light structure 110 can additionally or alternatively include an integrated power supply, such as a rechargeable battery. In this implementation, the router 160 (or the computer system 190 directly) can wirelessly broadcast color value arrays to light structures in the assembly, such as over short-range wireless communication protocol.

7. Light Structure Identification

Block S110 recites retrieving addresses from light structures in the assembly. Generally, in Block S110, the computer system collects IP addresses, MAC addresses, and/or other configuration data from each light structure connected to the router, as shown in FIG. 1.

In one implementation, the computer system collects IP addresses from the router in Block S110. In this implementation, the computer system can pass each IP address received from the router into a DNS to retrieve configuration data for each light structure in the assembly, such as including a total number of light elements in each light structure, a shape and size (e.g., one-meter cube) of each light structure, and a maximum power output of each light structure (e.g., 25 Watts, 100 Watts). For example, the computer system can pass IP addresses received from light structures in the assembly to a remote computer system over the Internet; the remote computer system can then query a name mapping system for a virtual model of each light structure and then return digital files containing these light structures to the computer system via the Internet. The computer system can then extract a number, configuration, and/or subaddresses of light elements in each light structure from these virtual models in Block S110 and implement these data in Block S120 to generate a sequence of test frames for the assembly. As described below, the computer system can also implement virtual models of the light structures to construct the virtual map of the assembly in Block S170 described below.

Alternatively, a light structure can store its configuration data in local memory and can transmit these data upon request. For example, upon receipt of an IP address from a light structure at the router, the computer system can query the light structure at this IP address for its configuration and then store data subsequently returned by the light structure (e.g., a number, configuration, and/or subaddresses of light elements in the light structure) with this IP address in Block S110

In another implementation, the computer system can receive unique identifiers—encoded with light structure configuration data—from each light structure in the assembly. For example, once light structures are connected to the router and the computer system is connected to the router, the computer system can query each port of the router for a unique ID. The computer system can then extract configuration data —such as number, configuration, and subaddresses of light elements—of each light structure from its unique identifier and associate these configuration data with the corresponding port in the router. However, the computer system can implement any other method or technique to collect an identifier and configuration data for each light structure in the assembly.

8. Test Frame Sequence Generation

Block S120 of the method S100 recites, based on addresses retrieved from light structures in the assembly, generating a sequence of test frames. Generally, in Block S120, the computer system (or any other remote computer system) generates a sequence of test frames that can be executed by the assembly of light structures to selectively activate and deactivate light elements across the assembly. An imaging system 190 (e.g., a camera distinct from or integrated into the computer system) can capture images of the assembly in Block S140 while the assembly executes the sequence of test frames, and the computer system (or other remote computer system) can manipulate and compile these images into a virtual 3D map of real positions of each addressed light element within each light structure within the assembly in Block S170.

In one implementation, the computer system generates a sequence of test frames including: a reset frame specifying activation of multiple (e.g., all) light elements in light structures (e.g., all light structures) in the assembly; a set of synchronization frames succeeding the reset frame and specifying activation of light elements (e.g., all light elements) in multiple (e.g., all) light structures in the assembly; a set of pairs of blank frames interposed between adjacent synchronization frames and specifying deactivation of light elements (e.g., all light elements) in light structures (e.g., all light structures) in the assembly; and a set of test frames interposed between adjacent blank frame pairs, each test frame in the set of test frames specifying activation of a unique subset of light elements (e.g., a single light element) in light structures (e.g., a single light structure) within the assembly. For example, the computer system generates a sequence of test frames that, when executed by the assembly of light structures: turns all light elements in all light structures in the assembly off; turns all light elements in all light structures in the assembly on in the reset frame to indicate the beginning of the test sequence; turns all light elements in all light structures in the assembly off; and then, for each light element in the assembly, turns the light element on while keeping all other light elements off in the test frame, turns all light elements off in a first blank frame, turns all light elements on in a synchronization frame to provide a reference synchronization marker, and then turns all light elements off in a second blank frame.

In the foregoing implementation, the reset frame defines a start of the test sequence that can later be optically identified in the sequence of images—captured by the imaging system during execution of the test sequence—such as by counting a number of bright (e.g., white) pixels in each image and comparing adjacent images in the sequence of images. In particular, the computer system can insert, at the beginning of the test sequence, a reset frame that defines activation of a pattern of light elements (e.g., all light elements) in the assembly and that, when executed by light structures in the assembly, can be identified in an image of the assembly to synchronize the beginning of the test sequence to the sequence of images in Block S150. The computer system (or other remote computer system) can also compare an image of the assembly executing the reset frame to an image of the assembly executing a blank frame to generate an image mask that, when applied to an image in the sequence of images, rejects a region in the image that does not correspond to the assembly in Block S162, as described below. In one example in which each light structure in the assembly includes 180 RGB light elements, the computer system: defines a color value array including a sequence of 180 bright white (e.g., [255, 255, 255]) color values; and compiles a set of such color value arrays—including one such color value array per light structure in the assembly—to generate the reset frame.

The computer system can set an extended duration for the reset frame. For example, the imaging system can be configured to capture images at a frame rate of 120 Hz, and each light structure can be configured to load and implement a new frame at a rate of 30 Hz. During an automatic mapping cycle (and during other operating periods), the computer system can write a new frame to the light structure assembly at a rate of 30 Hz in Block S130 such that the imaging system can capture at least two images of the assembly executing each test frame in the sequence of test frames in Block S140. In this example, the computer system can specify an extended delay between execution of the reset frame and execution of a subsequent blank frame, such as a delay of two seconds, in the test frame sequence. Alternatively, the computer system can insert 60 identical reset frames into the test frame sequence to achieve a similar reset period at the assembly during execution of the test frame sequence.

In this implementation, the computer system appends the reset frame(s) with a light element test module for each light element in each light structure in the assembly. In particular, for each light element in the assembly, the computer system can insert a light element test module that specifies: a blank frame in which all light elements in the assembly are deactivated; a test frame in which a single corresponding light element is activated; a blank frame; and a synchronization frame in which all light elements in the assembly are activated (i.e., like the reset frame). In one example, the computer system sums a total number of light elements in each light structure in the assembly based on configuration data retrieved for each light structure, as described above, to determine a total number of light element test modules for the test frame sequence. In this example, the computer system then assigns an address (e.g., an IP address) of a particular light structure and an address of a particular light element in the particular light structure to each light element test module. For each light element test module, the computer system then: generates a unique color value array—for the assigned light structure—specifying activation of the assigned light element and specifying deactivation of all other light elements in the assigned light structure; generates color value arrays specifying deactivation of all light elements for all other light structures in the assembly; and compiles the unique color value array for the assigned light structure and color values arrays of all light structures in the assembly into a test frame for the light element test module. Like the reset frame, the computer system can generate a generic synchronization frame by compiling color value arrays specifying activation of (e.g., a [255, 255, 255] color value for) all light elements in all light structures in the assembly and can populate each light element test module with a copy of this generic synchronization frame. Similarly, the computer system can generate a generic blank frame by compiling color value arrays specifying deactivation of (e.g., a [0, 0, 0] color value for) all light elements in all light structures in the assembly and can then populate each light element test module with a copy of this generic synchronization frame.

As described above, the computer system can define durations of each blank frame, test frame, and synchronization frame in the test frame sequence, such as by defined delays between blank frames, test frames, and synchronization frames in the test frame sequence. For example, the computer system can define 0.5-second delays when switching from a blank frame to a test frame, from a test frame to a blank frame, from a blank frame to a synchronization frame, and from a synchronization frame to a blank frame within a light element test module in order to ensure sufficient time for the imaging system to capture at least two images of each frame executed by light structures in the assembly. Alternatively, the computer system can insert duplicate blank frames, test frames, and/or synchronization frames in the test frame sequence in order to achieve similar frame durations.

In one variation, the computer system also generates an image mask sequence and prepends the reset frame with the image mask sequence. In one example, the computer system generates an image mask sequence by assembling a number of blank frame and synchronization frame pairs sufficient to span a target mask generation duration, such as 45 blank frame and synchronization frame pairs switched at a frame rate of 30 Hz over a target mask generation duration of 30 seconds, and then inserts the image mask sequence ahead of the reset frame in the test frame sequence. The imaging system can later capture images of the assembly executing the image mask sequence, and the computer system (or other remote computer system) can generate an image mask for images captured after execution of the reset frame based on the images captured during execution of the image mask sequence in Block S162, as described below.

Furthermore, the computer system can insert a second reset frame into the test frame sequence following a last blank frame or synchronization frame in order to indicate the end of the test frame sequence to the computer system (or other remote computer system) and/or to a human operator.

The computer system can also generate an event timeline including event markers corresponding to the reset frame(s), blank frames, and synchronization frames and light element subaddress markers corresponding to light elements specified as active in test frames within the test frame sequence.

However, the computer system can implement any other method or technique to specify a color value for a light element in the assembly, to aggregate color values for light elements in a light structure into a color value array or other container; to compile color value containers for one or more light structures into a frame, and to assemble multiple frames into a test frame sequence that can then be executed by the assembly of light structures during an automatic mapping cycle.

8. Test Frame Sequence Execution

Block S130 of the method S100 recites, during a test period, transmitting the sequence of test frames to light structures in the assembly; and Block S140 of the method S100 recites, during the test period, at an imaging system, capturing a sequence of images of the assembly. Generally, during an automatic mapping cycle, the computer system feeds frames in the test frame sequence to the assembly of light structures in Block S130, light structures in the assembly selectively activate and deactivate their light elements based on their assigned color value containers in each subsequent frame received from the computer system (e.g., via the router), and an imaging system defining a field of view including the assembly captures a sequence of images in Block S140, as shown in FIG. 1.

In one example, a human operator places the imaging system (e.g., a standalone camera or DSLR, a smartphone) in a first location in front of the assembly, orients the imaging system to face the assembly such that the full assembly is within the field of view of the imaging system, sets the imaging system to capture a first video (i.e., a first sequence of images at a substantially uniform frame rate) according to Block S140, and triggers the computer system to drip-feed frames in the test frame sequence to the assembly according to Block S130. Upon completion of the test frame sequence, the human operator places the imaging system in a second location offset from the first location (e.g., by ten to fifteen feet), again orients the imaging system to face the assembly such that the full assembly is within the field of view of the imaging system, sets the imaging system to capture a second video (i.e., a second sequence of images at a substantially uniform frame rate), and triggers the computer system to again drip-feed frames in the same test frame sequence to the assembly. However, the imaging system and the computer system can be manually or automatically triggered in any other way.

The imaging system can then upload the first and second videos to the computer system or to another computer system, such as over a wired or wireless communication protocol.

9. Image Mask

As shown in FIG. 1, one variation of the method S100 includes Block S162, which recites generating an image mask. Generally, in Block S162, the computer system processes a subset of images captured by the imaging system during execution of the test frame sequence (e.g., specifically during the image mask sequence) to identify a region in the field of view of the imaging system that corresponds to light elements in light structures in the assembly and to define this region in an image mask. The computer system can then apply the image mask to other images in the sequence of images in Block S160 to discard regions in these images that do not correspond to light elements in the assembly.

In the implementation above in which the computer system inserts an image mask sequence in the test frame sequence ahead of the first reset frame, the computer system can: identify a set of discard images at the beginning of the image sequence (e.g., a first 360 images spanning a first three seconds of the image sequence); identify a reset image captured during execution of the (first) reset frame by the assembly in the sequence of images, as described below; and select a set of image masks between the set of discard images and the reset image. The computer system can then record an accumulated difference between adjacent images in the set of image masks to generate the image mask. For example, the computer system can: convert each image to grayscale (e.g., 256-bit grayscale images in which a pixel value of "0" corresponds to black and in which a pixel value of "255" corresponds to white); and then, for each pair of adjacent images in the set of image masks, subtract the first image in the pair from the second image in the pair to construct a first difference image and subtract the second image in the pair from the first image in the pair to construct a second difference image. The computer system can then sum all first and second difference images from the set of image masks, normalize this sum, and convert this normalized sum to black and white to generate the image mask.

In this implementation, for a pair of adjacent images captured by the imaging system while light elements in the assembly are transitioning from deactivated to activated according to a new mask frame, the first difference image will contain image data (e.g., grayscale values greater than "0") representative of a region in the field of view of the imaging system that changes in light value when the assembly transitions from a blank frame to a mask frame. Therefore, the first difference image will contain image data representative of a region in the field of view of the imaging system corresponding to light elements in the assembly (and to surfaces on light structures within the assembly and to background surfaces near light elements in the assembly). However, for this pair of adjacent images captured while light elements in the assembly are transitioning from deactivated to activated according to a new mask frame, pixels in the second difference image may generally saturate to "0" such that summing the first difference image and the second difference image yields approximately the first difference image representing a region in the field of view of the imaging system corresponding to light elements in the assembly.

Similarly, for a pair of adjacent images captured by the imaging system while light elements in the assembly are transitioning from activated to deactivated according to a new blank frame, the second difference image will contain image data representative of a region in the field of view of the imaging system corresponding to light elements in the assembly. However, for this pair of adjacent images captured while light elements in the assembly are transitioning from activated to deactivated according to a new blank frame, pixels in the first difference image may generally saturate to "0" such that summing the first difference image and the second difference image yields approximately the second difference image representing a region in the field of view of the imaging system corresponding to light elements in the assembly.

The computer system can thus sum the first and second difference images from all pairs of adjacent images captured by the imaging system during execution of the image mask sequence by the assembly to generate an accumulator image containing image data corresponding to all regions within the field of view of the imaging system that exhibited light changes during the image mask sequence. The computer system can: normalize the accumulator image by dividing grayscale values in the accumulator image by the number of difference images compiled into the accumulator image; apply a static or dynamic grayscale threshold (e.g., 127 in a grayscale range of 0 for black to 255 for white) to convert pixels in the normalized accumulator image of grayscale value less than or equal to the grayscale threshold to a rejection value (e.g., "−255") and to convert pixels in the normalized accumulator image of grayscale values greater less than the grayscale threshold to a pass value (e.g., "0"). The computer system can thus define the image mask from rejection pixels and pass pixels in the normalized accumulator image in Block S162.

The computer system (or other remote computer system) can then convert remaining images in the sequence of images (e.g., images between the first and second reset images) to grayscale and add (or subtract) the image mask to each remaining image in order to remove regions in these images not corresponding to light elements in the assembly, surfaces on light structures within the assembly, or background surfaces near light elements in the assembly from these images. The computer system can process these masked or "filtered" images in Blocks S150 and S160, as described below.

10. Event Alignment

Block S150 of the method S100 recites aligning the sequence of test frames to the sequence of images based on the reset frames, the set of synchronization frames, and values of pixels in images in the sequence of images. Generally, in Block S150, the computer system synchronizes the sequence of images to the test frame sequence to enable subsequent correlation of a detected light element in an image in the image sequence to light element subaddress specified as active in a frame executed by the assembly when the image was recorded, as shown in FIG. 1.

In one implementation, the computer system converts images in the sequence of images to grayscale, applies the image mask to the grayscale images as described above, and then counts a number of pixels containing a grayscale value greater than a threshold grayscale value (e.g., "light pixels" containing a grayscale value greater than 200 in a grayscale range of 0 for black to 255 for white) in each image. The computer system then flags each image that contains more than a threshold number of light pixels as a synchronization (or reset) image captured at a time that a synchronization (or reset) frame is executed by the assembly. For example, the computer system can calculate the threshold number of light pixels as a fraction of (e.g., 70% of) pixels not masked by the image mask. The system also identifies an extended sequence of consecutive flagged images recorded near the beginning of the automatic mapping cycle and stores images in this sequence of consecutive flagged images as reset images. (The computer system can similarly identify a second extended sequence of consecutive flagged images recorded near the end of the automatic mapping cycle and can store images in this second sequence of consecutive flagged images as reset images.)

The computer system can then count the number of discrete clusters of synchronization images between the reset images and compare this number to the number of discrete synchronization frames (or discrete clusters of synchronization frames) in the test frame sequence to confirm that all synchronization events were identified in the image sequence. If fewer than all synchronization events were identified in the image sequence, the computer system can reduce a grayscale threshold implemented in Block S162 to generate the image mask, reduce a grayscale threshold implemented in Block S150 to identify light pixels, and/or reduce a threshold number of light pixels corresponding to a synchronization in order to detect more synchronization events in the image sequence; and vice versa.

Once the number of discrete clusters of synchronization images in the image sequence is confirmed, the computer system can detect a test image (i.e., an image recorded while a test frame is executed by the assembly) between each adjacent cluster of synchronization frames and tag each test image with a subaddress of a light element activated during the corresponding test frame. For example, for each adjacent pair of synchronization image clusters in the image sequence, the computer system can: select a subset of masked grayscale images substantially centered between the synchronization image clusters; count a number of pixels containing a grayscale value greater than a threshold grayscale value ("light pixels") in each image in the subset of images; flag a particular image in the subset of images that contains the greatest number of light pixels as a test image; and then tag the test image with the subaddress of the light element recorded in a light element subaddress marker in a corresponding position in the event timeline described above. The computer system can thus identify a single test image for each test frame in the test frame sequence and tag or otherwise associate each test image with the subaddress of the (single) light element in the assembly activated when the test image was captured in Block S150.

11. Light Element Detection

Block S160 of the method S100 recites, for a particular test frame in the set of test frames, determining a position of a light element, addressed in the particular test frame, within a particular image, in the sequence of images, corresponding to the particular test frame based on values of pixels in the particular image. Generally, in Block S160, the computer system determines a position of an active light element within each test image identified in the image sequence, as shown in FIG. 1.

In one implementation, for each test image, the computer system: scans the masked grayscale test image for pixels containing grayscale values greater than a threshold grayscale value ("light pixels"); counts numbers of light pixels in contiguous blobs of light pixels in the test image; calculates the centroid of light pixels in a particular blob of light pixels containing the greatest number of light pixels in the test image; and stores the centroid of the particular blob as the position of the light element in the test image. For example, for each test image, the computer system can store the (X, Y) pixel position of a pixel in the test image nearest the centroid of the blob—relative to the top-left corner of the test image—in cells in a light element position table assigned to the light element subaddress corresponding to the test image. In this example, if no light pixel blob is detected in a test image, the computer system can process an adjacent test for a light pixel blob or can leave empty cells in the table assigned to the light element subaddress corresponding to the test image. In this implementation, the computer system can also reject blobs of light pixels in a test image corresponding to light reflected from a surface near an active light element. For example, for each test image in the image sequence, the computer system can: scan to detect light pixels in the masked grayscale test image; count numbers of light pixels in contiguous blobs of light pixels in the test image; identify the two blobs of light pixels containing the greatest numbers of light pixels in the test image; select a particular blob of light pixels—from the two blobs of light pixels—at a highest vertical position in the test image in order to reject light reflected from a floor surface; calculate the centroid of light pixels in the particular blob of light pixels; and store the centroid of the particular blob as the position of the light element in the test image.

The computer system: can then generate a two-dimensional (2D) composite image representing positions of light elements in the field of view of the imaging system during execution of the test frame sequence from centroid positions (e.g., (X, Y) values) stored in the light element position table; and can tag each point in the composite image with the subaddress of its corresponding light element. For the assembly constructed of light structures including light elements arranged along linear beams and tested in series during the image test sequence, the computer system can calculate lines of best fit (e.g., one in the X-direction and another in the Y-direction) for subsets of (X, Y) points representing subsets of light elements in each light structure in the assembly based on light element subaddresses of light structures in the assembly and known number of light elements along linear beams in the light structures. The computer system can then discard or flag outliers in the light element position table before transforming the table—or an image constructed from the table—into a virtual 3D map of the light structure in Block S170.

The computer system can repeat the foregoing Blocks of the method S100 for the second sequence of images recorded by the imaging system during execution of the same or similar test frame sequence by the assembly in order to generate a second composite image representing positions of light elements in the field of view of the imaging system when arranged at a different location relative to the assembly. However, the computer system can implement any other method or technique to identify positions corresponding to light elements in test images and can store these positions in any other way.

12. Virtual Map

Block S170 of the method S100 recites aggregating positions of light elements and corresponding subaddresses identified in images in the sequence of images into a virtual 3D map of positions and subaddresses of light elements within the assembly. Generally, in Block S170, the computer system merges two or more composite images—representing positions of light elements in fields of view of the imaging system placed at various locations relative to the assembly during execution of multiple (like or similar) test frame sequences—into a virtual 3D map of the light elements in light structures in the assembly, as shown in FIG. 1.

In one implementation, the computer system performs three-dimensional (3D) reconstruction methods to generate a 3D point cloud from the composite images generated in Block S160. In particular, the computer system can identify (X, Y) points in the first composite image that correspond to the same (X, Y) points in the second composite image based on like light element subaddress assignments, define these points as reference points, and then construct a virtual 3D representation of the assembly from the composite images based on these shared reference points in both composite images. In this implementation, the computer system can also retrieve gyroscope data, accelerometer data, compass data, and/or other motion data recorded by sensors within the imaging system when moved from a first position after recording the first image sequence to a second position in preparation to record the second image sequence, and the computer system can implement dead reckoning or other suitable methods and techniques to determine the offset distance and relative orientation between the first and second positions. Alternatively, the computer system can determine the offset distance and relative orientation between the first and second positions based on GPS or other suitable data collected by the imaging system during or between recordation of the image sequences. The computer system can orient the first and second composite images and can calculate a fundamental matrix for the automatic mapping cycle based on the offset distance and relative orientation between the first and second positions.

The computer system can then pass each point in the composite images into the fundamental matrix to generate a 3D point cloud and can confirm viability of the fundamental matrix and alignment of the 2D composite images in 3D space based on proximity of reference point pairs from the composite images into the 3D point cloud. The computer system can select a group of points in the 3D point cloud—corresponding to a linear beam in light structure in the assembly—and shift points in this group of points into alignment with real known positions of light elements in the linear beam of a light structure. For example, for the assembly that includes cubic light structures, the computer system can select groups of points in the point cloud, each group of points corresponding to one cubic light structure, and then transform the 3D point cloud to achieve nearest approximations of cubes across all groups of points in the 3D point cloud. In this example, the computer system can also retrieve real offset distances between light elements in light structures in the assembly and can scale the 3D point cloud based on these real offset distances between light elements. Furthermore, the computer system can map a virtual model of a light structure, as described above, to groups of points in the 3D point cloud to identify and discard points not intersecting or falling within a threshold distance of a light element position within the virtual model of the light structure. Similarly, the computer system can identify points missing from the point cloud and their corresponding light element subaddresses based on nearby light element subaddresses and light element positions defined in a virtual model of light structures inserted into the 3D point cloud, and the computer system can complete the 3D point cloud by inserting these points and their corresponding light element subaddresses into the 3D point cloud. The computer system can also shift positions of points in the 3D point cloud to better align with light element positions defined in the virtual model of the light structure applied to the 3D point cloud in order to improve alignment of light element represented in the 3D point cloud.

However, the computer system (or other remote computer system) can implement any other method or technique in Block S170 to generate a 3D point cloud or other virtual 3D map of positions and subaddresses of light elements within the assembly.

13. Tethered Imaging System

In one variation shown in FIG. 4, the method S100 includes: receiving addresses from light structures in the assembly in Block S110; generating a baseline frame specifying deactivation of light elements in light structures in the assembly in Block S120; based on addresses retrieved from light structures in the assembly, generating a sequence of test frames succeeding the baseline frame in Block S120, each test frame in the sequence of test frames specifying activation of a unique subset of light elements in light structures within the assembly; sequentially serving the baseline frame followed by the sequence of test frames to the assembly for execution in Block S130; and receiving a baseline image recorded by an imaging system during execution of the baseline frame at the assembly in Block S140. In this variation, the method S100 also includes, for a first frame in the sequence of test frames: receiving a first photographic test image recorded by the imaging system during execution of the first test frame by the assembly in Block S140, the first test frame specifying activation of a first light element in a first light structure in the assembly; and identifying a first location of the first light element within a field of view of the imaging system based on a difference between the first photographic test image and the baseline image in Block S160. Similarly, the method S100 includes, for a second frame in the sequence of test frames: receiving a second photographic test image recorded by the imaging system during execution of the second test frame by the assembly in Block S140, the second test frame specifying activation of a second light element in the first light structure; and identifying a second location of the second light element within the field of view of the imaging system based on a difference between the second photographic test image and the baseline image in Block S160. The method S100 further includes: retrieving a first virtual model of the first light structure based on an address of the first light structure, the virtual model defining a geometry of and locations of light elements within the first light structure in Block S170; locating the first virtual model of the first light structure within a 3D virtual map of the assembly by projecting the first virtual model of the first light structure onto the first location of the first light element and onto the second location of the second light element in Block S160; and populating the 3D virtual map with points representing locations associated with unique addresses of light elements within the assembly in Block S170.

In particular, in this variation, the method S100 can include: based on addresses retrieved from light structures in the assembly, deactivating light elements across the assembly; in response to deactivation of light elements across the assembly, capturing a first reference image of the assembly; activating light elements across the assembly; in response to activation of light elements across the assembly, capturing a second reference image of the assembly; and generating an image mask based on a difference between the first reference image and the second reference image. In this variation, the method S100 also includes: for each subset of light elements in light structures within the assembly, activating the subset of light elements and, in response to activation of the subset of light elements, capturing a test image of the assembly; for each test image, identifying a position of an activated light element within a region of the test image outside of the image mask; and aggregating positions of light elements identified in test images into a virtual 3D map of positions and subaddresses of light elements within the assembly.

Generally, in this variation, the computer system implements methods and techniques similar to those described above but implements two-way wired or wireless communication with light structures in the assembly and with the imaging system to receive confirmation that a test frame transmitted to the assembly was executed by the assembly, to trigger the imaging system to capture an image of the assembly while executing a test frame, and to confirm that the imaging system captured an image of the assembly before loading a new test frame into the assembly. In particular, in this variation, the computer system can: define test frames in a sequence of test frames, each test frame specifying activation of single light element in the assembly, as described above; feed a single test frame to the assembly;

trigger the imaging system to capture an image of the assembly once confirmation of execution of the test frame is received from the assembly; feed a subsequent test frame to the assembly only after confirmation of recordation of an image from the imaging system; and repeat this process for the remaining test frames in the test frame sequence. Therefore, in this variation, the computer system can immediately associate each image recorded by the imaging system with a subaddress of a light element specified as active in the corresponding frame. The computer system can similarly load blank frames and mask frames into the assembly, trigger the imaging system to capture corresponding blank images and image masks, and implement methods and techniques described above to define an image mask based on these blank images and image masks. The computer system can then implement methods and techniques described above to apply the image mask to test images, identify light pixels corresponding to active elements in the test images, and to generate a 3D point cloud or other virtual 3D map of positions and subaddresses of light elements within the assembly.

In this variation, the computer system can also merge positive confirmation of execution of test frames and their corresponding test images to detect nonresponsive light elements and/or nonresponsive light structures in the assembly and to issue notifications or other prompts to test, correct, or replace nonresponsive light elements or light structures.

Furthermore, in this variation, the computer system and the imaging system can be physically coextensive, such as integrated into a smartphone, tablet, or other mobile computing device in communication with the router over a wired or wireless connection.

13.1 Test Frames

In this variation, the computer system can implement methods and techniques described above to generate a sequence of test frames defining activation of unique subsets (e.g., singular) of light elements within the assembly in Block S120. However, in this variation, the computer system can generate the set of test frames that excludes blank and reset frames. In particular, because the computer system is in communication with the imaging system via a wired or wireless link, the computer system can: serve a first test frame—in the sequence of test frames—to the assembly via the router; receive confirmation from light structures in the assembly that the first test frame has been implemented; trigger the imaging system to record a first photographic test image of the assembly; and receive confirmation that the imaging system recorded the first photographic test image before serving a second test frame—in the sequence of test frames—to the assembly.

In one implementation (and in implementations described above): the computer system defines a sequence of test frames; each test frame includes a set of numerical arrays; each numerical array is associated with an address (e.g., a MAC address, an IP address) of one light structure in the assembly and includes a set of values; and each value in a numerical array defines a color and intensity (or a "color value") of one light element at one light element in the corresponding light structure. In the implementation described above in which each light element in each light structure includes a tri-color LED, each numerical array can include one string of three values per light element in the corresponding light structure. In this implementation, each string of values corresponding to one light element can include a first value corresponding to brightness of a red subpixel, a second value corresponding to brightness of a green subpixel, and a third value corresponding to brightness of a blue subpixel in the light element. Upon receipt of such a numerical array, a light structure can pass the numerical array to a first light element; the first light element can strip the first three values from the numerical array, update intensities of its three subpixels according to these first three values, and pass the remainder of the numerical array to the second light element in the light structure; the second light element can strip the first three remaining values from the numerical array, update intensities of its three subpixels according to these three values, and pass the remainder of the numerical array to the third light element in the light structure; etc. to the last light element in the light structure.

Alternatively, each test frame can include one numerical array per subpixel color, such as one "red" numerical array, one "green" numerical array, and one "blue" numerical array. Upon receipt of such a set of numerical arrays, a light structure can pass the red, green, and blue numerical arrays to a first light element; the first light element can strip the first values from each of the numerical arrays, update intensities of its three subpixels according to these first values, and pass remainders of the numerical arrays to the second light element in the light structure; the second light element can strip the first remaining value from each of the numerical arrays, update intensities of its three subpixels according to these values, and pass remainders of the numerical arrays to the third light element in the light structure; etc. to the last light element in the light structure.

In Block S120, the computer system generates a sequence of test frames, wherein each test frame specifies activation of a unique subset (e.g., one) of light elements in the assembly. In one implementation, the computer system first identifies individually-addressable light elements in all light structures in the assembly. For example, the computer system can extract a number (and subaddresses) of light elements in a light structure in the assembly directly from a MAC address, IP address, or data packet received from the light structure via the router. Alternatively, the computer system can pass a MAC address, IP address, or other identifier received from the light structure to a name mapping system (e.g., a remote database), which can return a number (and subaddresses) of light elements in the light structure. Similarly, the computer system can pass a MAC address, IP address, or other identifier received from the light structure to a name mapping system; the name mapping system can return a 3D virtual model of the light structure—including relative positions and subaddresses of light elements in the light structure—to the computer system; and the computer system can extract relevant information from the virtual model to identify individually-addressable light elements in the light structure. However, the computer system can implement any other method or technique to characterize a light structure in the assembly, and the computer system can repeat this process for each other light structure in the assembly.

The computer system can then generate a number of unique test frames equivalent to a number of individually-addressable light elements in the assembly. In this implementation, each test frame can specify maximum brightness (in all subpixels) for one particular light element and specify minimum brightness (e.g., an "off" or deactivated state) for all other light elements in the assembly.

The computer system can then define an order for these test frames such that, when executed by the assembly in order: a first light element in a first light structure is activated exclusively; a second light element in the first light structure is activated exclusively; . . . a last light element in the first light structure is activated exclusively; . . . a first light element in a second light structure is activated exclusively; . . . a last light element in the second light structure is activated exclusively; . . . a first light element in a last light structure is activated exclusively; . . . and a last light element in the last light structure is activated exclusively.

Alternatively, the computer system can pseudorandomly order test frames specifying activation of light elements within one light structure. Similarly, for the light structure that defines a cubic structure, as shown in FIGS. 3B and 3C, the computer system can order test frames specifying activation of light elements within one light structure such that: a first light element along a first edge of the light structure is activated first; followed by a second light element along a second edge of the light structure; then a third light element along a third edge of the light structure; a fourth light element along a fourth edge of the light structure; a fifth light element along a fifth edge of the light structure; a sixth light element along a sixth edge of the light structure; and then a seventh light element along the first edge of the light structure, etc. (The computer system can similarly order test frames specifying activation of select light elements along edges of a light structure of any other form.) During execution of test frames specifying activation of light elements within a particular light structure and during recordation of images of the assembly during this process, the computer system can (re)calculate a location of the particular light structure in real space and (re)calculate a confidence score for the accuracy of this location in Block S160 following receipt of each subsequent image of the assembly recorded during activation of a different light element within the particular light structure. Once the computer system calculates a confidence score—for a location of the particular light structure—that exceeds a threshold score, the computer system can skip remaining test frames specifying activation of light elements in the particular light structure and immediately transition to serving test frames specifying activation of light elements in another light structure to the assembly in Block S130. Therefore, by ordering test frames to selectively activate light elements at strategic locations within a light structure in the assembly, the computer system can limit a total number of test frames necessarily executed by the assembly to yield a sufficiently accurate estimation of the real location of each light structure, thereby reducing a total duration of an automatic mapping cycle.

However, the computer system can order the sequence of test frames according to any other function or schema in Block S120. The computer system can also implement any other closed-loop methods and techniques to selectively serve test frames to light structures in the assembly until the location of a light structure is determined to a sufficient degree of confidence.

In this variation, the computer system can also define a baseline frame that specifies all light elements as inactive and prepend the sequence of images with the baseline frame. The computer system can additionally or alternatively inject a baseline frame between test images in the sequence or append the sequence of test frames with a baseline frame. During execution of the sequence of test frames, the computer system can trigger the imaging system to record a baseline image during execution of the baseline frame by the assembly; the computer system can then compare the baseline image to a photographic test image recorded during execution of a test frame to detect a lighting change within the assembly and to associate the location of this lighting change with the location of a light element activated during recordation of this photographic test image. In one implementation in which the computer system triggers capture of multiple baseline images during an automatic mapping cycle, the computer system can compare a photographic test image to a most-recent baseline in order to accommodate ambient lighting changes occurring throughout the automatic mapping cycle.

Similarly, the computer system can define a reset frame that specifies all light elements as active and prepend the sequence of images with the reset frame. The computer system can additionally or alternatively inject a reset frame between test images in the sequence or append the sequence of test frames with a reset frame. During execution of the sequence of test frames, the computer system can trigger the imaging system to record a reset image during execution of the reset frame by the assembly; the computer system can then compare the reset image to a baseline image to generate an image mask that defines all possible locations of light elements in the field of view of the imaging system, as described below.

However, the computer system can define any other type, number, and/or order of frames in the sequence of test frames.

13.2 Photographic Test Image Collection

In this variation, the computer system can also implement closed-loop techniques to selectively serve a next test frame to the assembly and to trigger the optical system to record a photographic test image of the assembly before serving a subsequent test frame to the assembly. For example, in Blocks S130 and S140, the computer system can: serve a first test frame, in the sequence of test frames, to the router for distribution throughout the assembly; then trigger the imaging system to record a first photographic test image of the assembly; in response to receipt of the first photographic test image (or receipt of confirmation from the imaging system that an image was recorded), serve a second test frame to the router for distribution throughout the assembly; trigger the imaging system to record a second photographic test image of the assembly; and then, in response to receipt of the second photographic test image, serve a third test frame to the router for distribution throughout the assembly; etc.

13.3 Light Element Detection

In one implementation, the computer system analyzes photographic test images substantially in real-time upon receipt from the imaging system in order to construct a virtual map of the assembly throughout the automatic mapping cycle. In this implementation, the computer system can serve a first test frame to the assembly in Block S130 and then trigger the imaging system to record a first photographic test image. Upon receipt of the first photographic test image from the imaging system in Block S140, the computer system can: convert the baseline and photographic test images to grayscale; subtract the grayscale baseline image from the grayscale photographic test image to calculate a difference image; identify a cluster of pixels in the difference image of value exceeding a threshold (e.g., "127"); and calculate a centroid of this cluster. The computer system can then: associate this centroid with a 2D location of a first light element—of known subaddress specified as active by the first test frame—in the field of view of the imaging system in Block S160. The computer system can also insert a first point—representing and labeled with the subaddress of the first light element—into a 2D composite image representing locations of light elements in the field of view of the imaging system. The computer system can repeat this process for subsequent test frames in the sequence to populate the 2D composite image with points representing other light elements in the assembly, as described above.

However, the computer system can implement any other methods and techniques described above to transform a photographic test image (and a baseline image, etc.) into a location of a particular light element within the field of view of the image sensor. The computer system can alternatively implement similar methods and techniques asynchronously to transform these images into a virtual map of the assembly following conclusion of the automatic mapping cycle.

13.4 Image Mask

In the implement described above in which the computer system generates a reset frame in Block S120 and serves the reset frame to the assembly in Block S130, the computer system can generate an image mask defining known locations of light elements in the field of view of the imaging system. The computer system can then scan regions of photographic test images (or two difference images, described above) bound by the image mask for changes in light intensity indicative of a particular light element in Block S160.

In one example, following receipt of a baseline image and a reset image from the photographic test image in Block S160, the computer system can: convert the baseline and reset images to grayscale; subtract the grayscale baseline image from the grayscale reset image to form a difference image mask; convert all pixels in this difference image mask of value greater than a threshold value (e.g., "127") to "white" (e.g., "255") and all remaining pixels to "black" (e.g., "0") to generate a black and white image mask. In this example, the "white" region of the image mask can define an "area of interest" corresponding to possible locations of all light elements in the assembly and locations of adjacent surfaces (e.g., reflective floor and wall surfaces adjacent the assembly).

The computer system can then project the white region within the image mask onto a photographic test image to bound a scan region for the photographic test image. For example, upon receipt of a photographic test image in Block S140, the computer system can: project the area of interest defined by the image mask onto the photographic test image; and then implement methods and techniques described above to selectively scan the area of interest projected onto the photographic test image for a bright region corresponding to a light element set as active during recordation of the photographic test image.

However, in this variation, the computer system can implement any other methods or techniques, such as described above, to generate an image mask and to apply the image mask to a region of a photographic test image (or to a difference image) to bound a region of the photographic test image that the computer system scans for a change in light intensity indicative of a state change of a light element in Block S160.

14. 2D-to-3D Reconstruction

In this variation, in Block S170, the computer system can transform the 2D composite image—representing positions of light elements in the field of view of the imaging system arranged in a static location throughout the automatic mapping cycle—into a virtual 3D map of light elements in the assembly. In this variation, the computer system can retrieve a geometry of a light structure in the assembly and map this geometry to points in the composite image addressed to the same light structure in order to approximate the 3D location and orientation of the light structure within the field of view of the imaging system.

In one implementation, the computer system can read a geometry directly from a first light structure connected to the computer system via the router, read a UUID from the first light structure and retrieve a geometry specific to the first light structure (e.g., in the form of a virtual model) from a database based on the UUID, or retrieve a generic or standard light structure geometry for the make and model of the first light structure. For example, if each light structure in the assembly is of the same type (e.g., a cubic structure with twelve edges and a strip of 180 light elements per edge), the computer system can retrieve a single generic virtual model of all light structures in the assembly and apply this generic virtual model to calculation of a relative position and orientation of each light structure in the assembly, as described below. In this implementation, the computer system can: serve a sequence of test frames that sequentially activate single light elements in the first light structure in a pseudorandom order in Block S130; trigger the imaging system to record one test image per test frame in Block S140; implement methods and techniques described above to identify a position of a discrete light element in the field of view of the imaging system in each subsequent test image in Block S160; and populate a composite image with a 2D position of a light element—and its subaddress—identified in each subsequent test image in Block S160. The computer system can then calculate a 3D location and orientation of the geometry of the light structure that best fits points in the composite image, such as in real-time following addition of each subsequent point to the composite image in Block S160.

In Block S170, the computer system: locates a composite image within a 2D plane in the virtual map of the assembly; and populates the composite image with a first point representing a first location of a first light element in a first light structure detected in a first test image received during an automatic mapping cycle. The computer system then: defines a first ray passing through the first point normal to the plane of the composite image; retrieves a virtual model of the first light structure (e.g., a 3D graphical model defining locations of light elements and their subaddress in the first light structure); and calculates a 3D best-fit transform that aligns (e.g., snaps, locks, or pins) a location of the first light element represented in the virtual model to the first point in the composite image, thereby virtually constraining the virtual model of the first light structure in three degrees of translation. Once the computer system locates a second point—representing a second light element in the first light structure—in the composite image following receipt of a second test image, the computer system can: define a second ray passing through the second point normal to the plane of the composite image; and recalculate the 3D best-fit transform to align a location of the second light element represented in the virtual model to the second point in the composite image, thereby further constraining the virtual model of the first light structure in two degrees of rotation. Furthermore, once the computer system locates a third point—representing a third light element in the first light structure—in the composite image, the computer system can: define a third ray passing through the second point normal to the plane of the composite image; and recalculate the 3D best-fit transform to align a location of the third light element represented in the virtual model to the third point in the composite image, thereby further constraining the virtual model of the first light structure in a third degree of rotation.

Therefore, by calculating a 3D best-fit transform that aligns locations of light elements represented in the virtual model of the first light structure to points in the composite image generated from locations of light elements detected in test images recorded during activation of corresponding light elements in the first light structure, the computer system can define a function that maps the virtual model of the first light structure to the location and orientation of the first light structure in real space (e.g., relative to the imaging system). For example, the 3D best-fit transform can define: a lateral (e.g., "x-axis") translation that shifts light element locations in the virtual model of the first light structure into horizontal alignment with points in the 2D composite image; a vertical (e.g., "y-axis") translation that shifts light element locations in the virtual model of the first light structure into vertical alignment with points in the 2D composite image; a depth (e.g., "z-axis") translation corresponding to a scale factor that maps the virtual model of the first light structure to the distances between points in the composite image; and pitch, yaw, and roll (e.g., x-, y-, and z-axis) rotations that orient light element locations in the virtual model to corresponding points in the composite image in Block S170.

In particular, in the foregoing implementation, the computer system can: compile locations of light elements detected in test images recorded during activation of light elements in the first light structure into a 2D composite image; define one ray passing through each light element location in the composite image and normal to the plane of the composite image; and then calculate a 3D best-fit transform that minimizes distances between each point in the virtual model of the light structure and rays coinciding with a location of a corresponding light structure represented in the composite image. The computer system can repeat this process for each additional light element location inserted into the composite image in Block S160 to recalculate the 3D best-fit transform for the virtual model of the first light structure in Block S170.

In this implementation, following (re)calculation of the 3D best-fit transform for the virtual model of the first light structure, the computer system can also calculate a confidence score for accuracy of the 3D best-fit transform in representing the location and orientation of the first light structure in real space. For example, the computer system can: transform the virtual model of the first light structure according to the 3D best-fit transform within the virtual map of the assembly; calculate nearest distances from light element locations in the virtual map to rays passing through corresponding points in the composite image; and then compile these distances into a single composite score representing accuracy of the 3D best-fit transform in aligning locations of light elements represented in the virtual model of the first light structure with points representing corresponding light elements in the composite image. In particular, the computer system can calculate a confidence score for the 3D best-fit transform: as a function of (e.g., directly proportional) to distances between the light element locations in the virtual model and rays passing through corresponding points in the composite image; and as a function of (e.g., inversely proportional to) a number of points in the composite image successfully mapped to the light element locations represented in the virtual model of the first light structure.

Alternatively, the computer system can apply the 3D best-fit transform to the virtual model of the first light structure to locate the virtual model within the 3D virtual map of the assembly and project the 3D location of a next light element in the virtual model onto the 2D plane of the composite image to calculate a location estimate for the next light element. Upon receipt of a test image recorded during execution of a test frame specifying activation of this next light element, the computer system can detect a location of the next light element in this next test image, calculate a distance between the location estimate and the location of the next light element detected in the next test image, and then calculate a confidence score for the 3D best-fit transform as a function of (e.g., proportional to) this distance. However, the computer system can implement any other method or technique to calculate a confidence score for the 3D best-fit transform for the virtual model of the first light structure and can repeat this process following receipt of each subsequent test image recorded during activation of a light element within the light structure. (The computer system can implement similar methods and techniques to calculate a confidence score for detected locations of light elements in the assembly according to Blocks of the method S100 described above.)

Once the computer system calculates a confidence score for the 3D best-fit transform that exceeds a minimum threshold score, the computer system can: store the 3D best-fit transform as final for the first light structure; discard (e.g., withdraw, cancel) all remaining test frames specifying activation of a light element within the first light structure; transition to serving test frames specifying activation of light elements within a second light structure in the assembly; and repeat the foregoing methods and techniques to calculate a 3D best-fit transform for a virtual model of the second light structure. The computer system can repeat this process for each other light structures in the assembly until a 3D best-fit transform is calculated for a virtual model of each light structure in the assembly.

Alternatively, the computer system can: serve a complete subset of test frames specifying activation of all light elements in a light structure; collect test images recorded during execution of each of these test frames; compile locations of light elements extracted from each of these test images into a 2D composite image; and then implement the foregoing methods and techniques to calculate a 3D best-fit transform that minimizes distances between all points in the composite image and corresponding light element locations in the virtual model of the first light structure, such as upon conclusion of the automatic mapping cycle.

The computer system can therefore fuse a known geometry of a light structure—such as defined by a virtual model of the light structure—with a sequence of 2D test images captured during activation of select light elements in the light structures to calculate a 3D best-fit transform that maps the known geometry of the light structure onto the position and orientation of the light structure in real space (e.g., relative to the imaging system).

Once the computer system maps the light structure geometry to the composite image (e.g., once the computer system aligns the light structure geometry to points in the composite image to determine the 3D location and orientation of the light structure relative to the imaging system in real space), the computer system can repeat this process for each other light structure in the assembly in order to calculate 3D best-fit transforms that locate virtual models of these other light structures in positions and orientations—in the virtual map—substantially representative of the relative positions and orientations of these light structures in real space. By applying these 3D best-fit transforms to virtual models of the corresponding light structures, the computer system can populate the virtual map with points representing each light element in the assembly and labeled with corresponding subaddresses.

Therefore, rather than merge locations of light elements detected in a first set of test frames recorded while the imaging system occupies a first position facing the assembly of light structures and in a second set of test frames recorded while the imaging system occupies a second position facing the assembly of light structures, the computer system can merge a virtual 3D model of a light structure with locations of light elements detected in a set of test frames recorded while the imaging system occupies a singular position facing the assembly, thereby reducing a total duration of the automatic mapping cycle and/or a need for manual repositioning of the imaging system. However, the computer system can implement any other method or technique in Block S170 to generate a 3D point cloud or other virtual 3D map representative of real positions of light elements within the assembly and their corresponding subaddresses.

14.1 Manual Adjustment and User Interface

Figure 5:
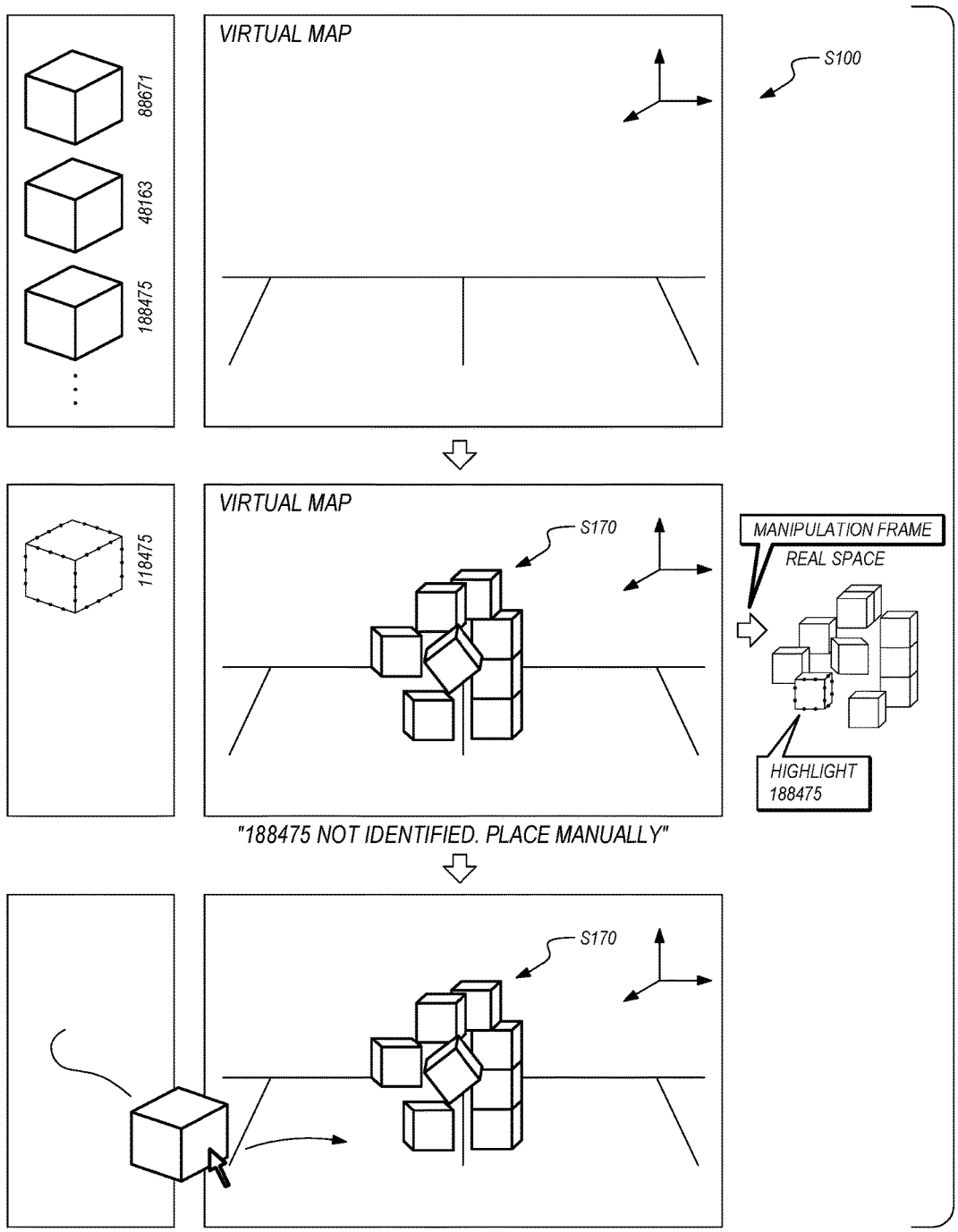
FIG. 5 is a flowchart representation of one variation of the method.
Figure 7:
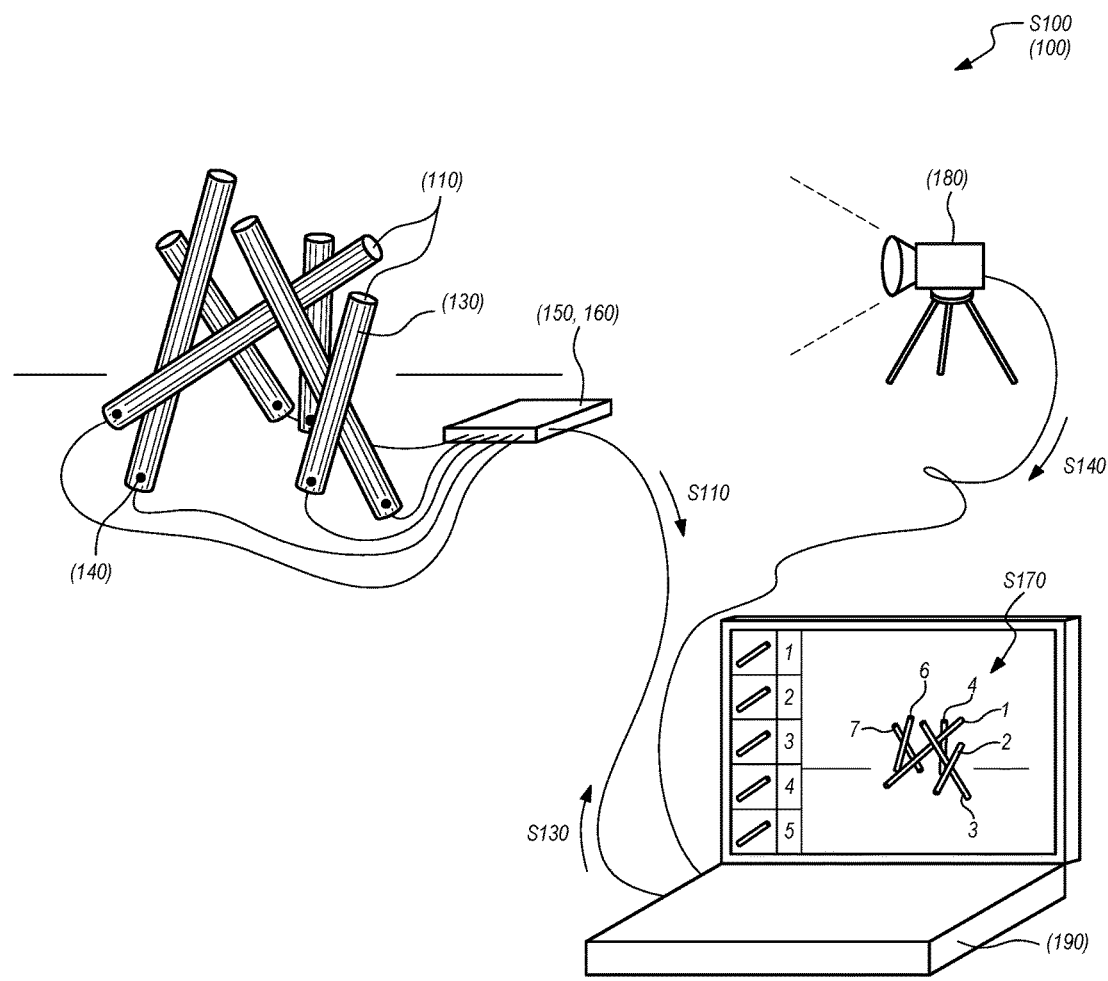
FIG. 7 is a schematic representation of one variation of the method.

In this variation, the computer system can render the virtual map of the assembly within a user interface and update the user interface (e.g., in real-time) to show points representing real locations of light elements and/or light structures detected in test images received from the imaging system, as shown in FIGS. 5 and 7.

In one implementation, the computer system retrieves a set of virtual models of all light structures in the assembly in Block S170, as described above. For example, the computer system can: retrieve one generic virtual model for each type of light structure contained in the assembly; generate one copy of the generic virtual model for each corresponding light structure in the assembly; and then write a subaddress of a light element in a light structure to a corresponding light element location in a corresponding virtual model for each light element in the assembly in order to generate a custom virtual model for each light structure. In this implementation, the computer system can then render the set of (custom) virtual models within a holding area adjacent (e.g., to the left of) the 3D virtual map represented within the graphical user interface. Once the computer system locates a first virtual model of a first light structure in the assembly within the 3D virtual map (e.g., by calculating a first 3D best-fit transform for the first virtual model at a first time), the computer system can render an animation showing the first virtual model moving from the holding area into a first position—representative of a detected orientation of the first light structure in real space—within the 3D virtual map in the graphical user interface. Subsequently, once the computer system locates a second virtual model of a second light structure in the assembly within the 3D virtual map (e.g., by calculating a second 3D best-fit transform for the second virtual model at a second time), the computer system can similarly render an animation showing the second virtual model moving from the holding area into a second position—representative of a detected orientation of the second light structure in real space—within the 3D virtual map in the graphical user interface. The computer system can repeat process for each other light structure in the assembly.

However, if the computer system is unable to identify light elements in test images recorded during execution of test frames specifying activation of light elements in a particular light structure such that the computer system is unable to detect the position and orientation of the particular light structure in real space, the computer system can preserve a virtual model of the particular light structure in the holding area in the user interface. The computer system can similarly preserve a virtual model of a particular light structure in the holding area in the user interface if a confidence score for the calculated location of the particular light structure (e.g., a confidence score for a 3D best-fit transform for the particular light structure) remains below a threshold confidence score. In this implementation, the computer system can prompt a user to manually locate the virtual model of the particular light structure within the virtual map, such as upon conclusion of the automatic mapping cycle. In an example shown in FIG. 5, if the computer system has failed to automatically confirm the location of a particular light structure upon conclusion of the automatic mapping cycle, the computer system can: render a notification within the user interface prompting the user to manually move the virtual model of the particular light structure into its position within the virtual map of the assembly; generate a manipulation frame specifying activation of light elements in the particular light structure and deactivation of all other light elements in the assembly; update the virtual model of the particular light structure to represent the same pattern and/or color of active light elements currently executed by the particular light structure; and translate (e.g., translate horizontally, translate vertically, and scale) and rotate the virtual model of the particular light structure within the virtual map according to inputs (e.g., a cursor drag input) into the user interface, thereby enabling the user to manually reposition the virtual model of the particular light structure within the virtual map. In this example, the computer system can generate the manipulation frame that specifies activation of light elements in blue at a first corner of the particular light structure, activation of light elements in red at a second corner of the particular light structure furthest from the first corner, and a substantially smooth color transition therebetween. By updating the virtual model of the particular light structure within the user interface accordingly, the computer system can enable the user to visually distinguish the orientation of the particular light structure relative to the assembly in real space and the virtual model of the particular light structure within the virtual map, thereby enabling the user to both locate and orient the virtual model of the particular light structure properly within the virtual map.

14.2 Interference

As the computer system locates virtual models of light structures in the virtual map of the assembly (or locates other points representing light elements within the virtual map), the computer system can check the virtual models for interference (e.g., virtual intersections not possible in real space). For example, if the computer system detects an intersection between two virtual models of two light structures in the virtual map that is not possible in real space, the computer system can: generate manual check frames that specify activation of light elements in these two light structures (e.g., as in a manipulation frame described above); serve the check frame to the assembly for execution; and serve a prompt at the user interface to confirm or correct locations of these virtual models in the virtual map. The computer system can then implement methods and techniques described above to adjust the positions of the corresponding virtual models in the virtual map based on inputs (e.g., drag inputs) entered by the user into the user interface.

The computer system can implement similar methods and techniques in response to detection of other anomalies in the virtual map. For example, if the computer system calculates a location of a particular light structure that is significantly removed from all or most other light structures in the assembly, the computer system can implement similar methods and techniques to prompt a user to confirm the location of this particular light structure or to manually move the virtual model of the particular light structure to its correct location within the virtual map.

In this variation, the computer system can also update a 3D best-fit transform for a virtual model of a light structure responsive to manual adjustments to the position of the virtual model entered into the user interface.

15. Pixel Colors

In one variation of the method S100, the computer system generates frames specifying activation of light elements in various colors (e.g., other than a color value of [255, 255, 255], or "bright white").

In one implementation, the computer system generates test frames that each specify activation of one light element in one color from a set of optically-discernible colors. For example, the computer system can store a set of seven optically-discernible color values including [0, 0, 255], [0, 255, 0], [255, 0, 0], [0, 255, 255], [255, 0, 255], [255, 255, 0], [255, 255, 255]. In this example, the computer system can tag or otherwise associate each test frame with both an address and a color value. Thus, when identifying a cluster of light pixels corresponding to an active light element in a test image, the computer system can select a bandpass filter that passes the color value specified in the corresponding test frame but rejects the remaining color values in the set of optically-discernible color values, and the computer system then applies this color filter to the test image prior to converting the image to grayscale. The computer system can thus generate test frames that specify activation of light elements in various color values and can confirm that a cluster of light pixels in a test image corresponds to a particular light element addressed as active in a particular test frame based on the color of the light pixel cluster.

Furthermore, in this variation, the computer system can generate test frames that specify multiple light elements in the assembly as active at one color value from a set optically-discernible color values, and the computer system can correlate clusters of light pixels in a corresponding test image with subaddresses of corresponding light elements based on color values of these light pixel clusters. For example, in each test frame, the computer system can set three light elements in the assembly as active, including a first light element in a first light structure at a color value of [0, 0, 255], a second light element in a second light structure at a color value of [0, 255, 0], and a third light element in a third light structure at a color value of [255, 0, 0]. The computer system can then apply three separate masks to the corresponding test image to detect a cluster of pixels in the test image corresponding to the first active light element, to detect a cluster of pixels in the test image corresponding to the second active light element, and to detect a cluster of pixels in the test image corresponding to the third active light element, as described above. The computer system can therefore generate test frames that specify simultaneous activation of light elements in different color values in order to test a group of light elements in an assembly over a shortened period of time.

Therefore, in this implementation, the computer system can: generate a first test frame specifying activation of a first light element in a first light structure at full brightness in a first color space (e.g., red) and specify activation of a second light element in a second light structure at full brightness in a second color space (e.g., green) in Block S120; identify a first location of the first light element within the field of view of the imaging system in Block S160 based on a difference between the baseline image and the first color space of a first photographic test image received during execution of the first test frame; and identify a second location of the second light element within the field of view of the imaging system in Block S160 based on a difference between the baseline image and the second color space of the first photographic test image. The computer system can therefore identify multiple unique light elements within a single photographic test image by leveraging multiple color spaces supported by both light elements in the light structures and the imaging system, thereby reducing a total duration of the automatic mapping routine.

Alternatively, the computer system can: generate test frames that specify activation of unique sets of light elements at the same color value (e.g., [255, 255, 255], or "bright white"), wherein each light element is specified as active at least twice in the test frame sequence; detect clusters of light pixels corresponding to multiple active light elements in each test image, as described above; and then, for each light element, assign a subaddress of a particular light element to a particular cluster of light pixels in a test image in response to a second test image—corresponding to a second test frame also specifying activation of the particular light element—including a cluster of light pixels in substantially the same location as the cluster of light pixels in the first test image. In this implementation, the computer system can then implement methods and techniques described above to generate a 3D point cloud or other virtual 3D map of positions and subaddresses of light elements within the assembly.

However, the computer system can generate test frames specifying activation of any other number or combination of light elements in any other one or more colors.

16. Light Patterns

Figure 6:
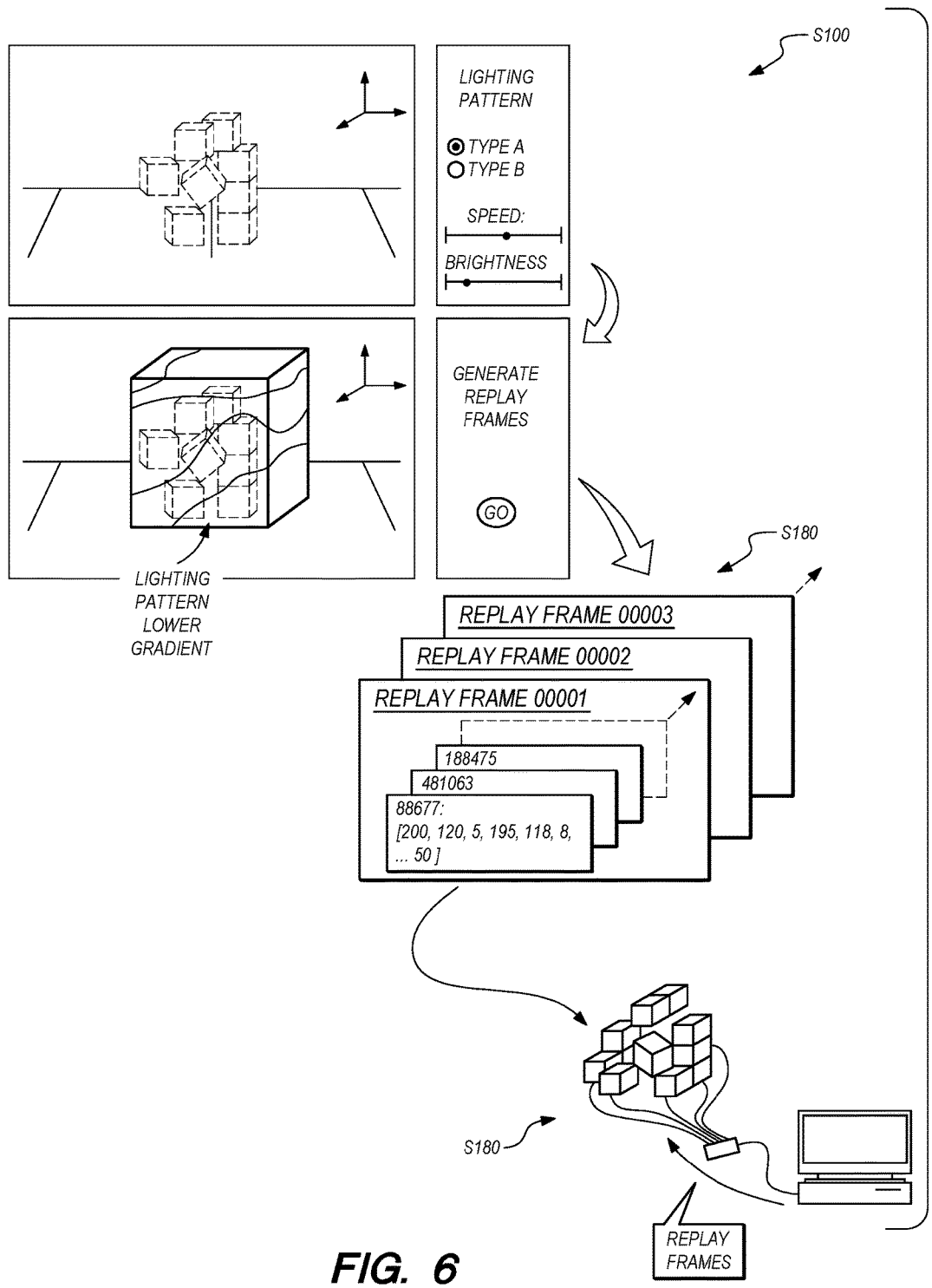
FIG. 6 is a flowchart representation of one variation of the method.

As shown in FIG. 6, one variation of the method S100 includes Block S180, which recites: mapping a predefined dynamic light pattern onto the 3D virtual map; generating a sequence of replay frames, each replay frame in the sequence of replay frames assigning a color value to each light element in the assembly according to a color pattern defined by the predefined dynamic light pattern at one instance within a duration of the predefined dynamic light pattern; and serving the sequence of replay frames to the assembly for execution. Generally, in Block S180, the computer system can map predefined virtual light patterns onto the virtual representation of the assembly in order to generate replay frames specifying activation of particular light elements in particular colors; the computer system can then load these replay frames into the assembly for execution by the light structures in order to recreate this predefined virtual light pattern in real space.

In one implementation, for each video frame in a 3D video, the remote controller can: project a video frame onto the virtual map of light elements in the assembly to generate a replay frame for the assembly; and then load these replay frames into the assembly in order to replay a form of the 3D video in real space. In particular, by mapping a video frame from a light pattern onto the virtual map of light elements, the computer system can calculate a color value for each light element in each light structure in the light structure assembly. The computer system can store each color value for each light element in an array assigned to one light structure and group a set of arrays—for an assembly of light structures—into one replay frame corresponding to the video frame. When each array in the replay frame is (substantially simultaneously) executed by its assigned light structure, the light structure assembly can physically represent the virtual video frame. The computer system can repeat this process for each video frame in the light pattern to generate one "RGB" array per light structure in the light structure assembly per replay frame of the light pattern.

In a similar implementation shown in FIG. 6, the computer system accesses a parameterized dynamic light pattern—selected by a user through the user interface—defining a virtual volume of color that changes in color value and intensity as a function of time. The computer system then: scales the virtual volume of the parameterized dynamic light pattern to the height, width, and depth of the point cloud of light elements in the virtual map of the assembly; and associates each point in the virtual map with a discrete virtual subvolume in the virtual volume of the parameterized dynamic light pattern. The computer system can also: record various parameters entered into the user interface, such as speed and intensity; adjust a speed of parameterized dynamic light patterns according to the speed selection; scale color values in each color space in the parameterized dynamic light pattern according to the intensity selection; and/or adjust the parameterized dynamic light pattern according to any other parameter. The computer system can then generate a replay frame for one instance of the parameterized dynamic light pattern by writing a color value of a subvolume—at the instance—to its corresponding point for each point in the virtual map. The computer system can implement a similar process to generate a replay frame for other instance within the parameterized dynamic light pattern, such as at a preset frame rate of 20 Hz. By then serving these replay frames to the assembly in sequence in Block S180, the computer system can recreate the parameterized dynamic light pattern in real space. In this implementation, the computer system can generate and serve replay frames to the assembly in real-time; the computer system can also adjust the parameterized dynamic light pattern in real-time based on parameters adjusted at the user interface.

In another implementation, the computer system generates a table containing subaddresses and real (X, Y, Z) positions of light elements in the assembly and passes the table into a user-driven replay frame generator (e.g., a replay frame generator application executing on the computer system) to reconstruct the assembly virtually within a user interface. The user can then select points within the user interface to activate or deactivate to create replay frames specifying activation and deactivation of corresponding light element subaddresses in the assembly, and the computer system can feed these replay frames to the assembly asynchronously or in real-time. In this implementation, the user-driven replay frame generator can include predefined light patterns, such as rainbow frames, horizontal and vertical light line sweep modules (i.e., a sequence of multiple replay frames), pulsing light modules, etc., and the user-driven replay frame generator can scale and transform a predefined light pattern selected by the user onto the virtual representation of the assembly in order to generate custom replay frames—that mimic the selected light pattern—for the assembly. The user-driven replay frame generator can also speed up and slow down predefined light pattern modules selected by the user, merge or smooth transitions between adjacent light pattern modules, etc. to create a sequence of replay frames for the assembly.

In a similar implementation, the computer system can generate a graph of light paths through the assembly. For each example, the computer system can generate a graph of nearest light elements within the assembly, receive a selection for a starting light element subaddress in the assembly, receive a selection for an ending light element subaddress in the assembly, and then create a sequence of replay frames that, when executed by the assembly, "snake" a small cluster of adjacent active light elements from the starting light element to the ending light element.

However, the computer system can implement any other method or technique to generate replay frames customized to the assembly (i.e., customized to the substantially unique arrangement of light structures in the assembly) based on the virtual representation of the assembly generated in Block S170.

15.1 Interpolation

In one implementation in which a lighting program executed by the computer system outputs replay frames at a frame rate less than a target frame rate of the system (e.g., 10 fps and 20 fps, respectively), the computer system can interpolate between two replay frames output by the lighting program to generate intermediate frames containing intermediate arrays; the computer system can serve both replay and intermediate frames to the assembly of light structures—via the router—in order to achieve the target frame rate and smoother transitions between replay frames.

For example, the computer system can calculate an intermediate array—in real-time or asynchronously—by interpolating between an array in a current replay frame sent to a light structure and an array in a last replay frame sent to the light structure and serve this intermediate array to the light structure before sending an array in a next replay frame to the light structure, thereby doubling the effective frame rate of the system. In this example, the computer system can implement linear interpolation or other interpolation techniques. The computer system can also interpolate between two (or more) replay frames to generate multiple intermediate frames between two replay frames, such as nineteen intermediate frames between each consecutive pair of replay frames to achieve a target frame rate of 400 fps (i.e., a refresh rate of 400 Hz) given a lighting program outputting replay frames at 20 fps.

15.2 Dithering

In another implementation, the computer system can inject noise into color values in arrays across multiple replay (and intermediate) frames, which, when executed by an assembly of light structures, may be perceived by a user as greater color depth in light elements across these light structures. In particular, the computer system can intentionally inject noise into arrays in a series of replay frames in order to achieve perception of greater color depth and/or perception of a greater number of colors for onlookers.

In one example, the computer system can inject or apply a sinusoidal noise signal—at a preset noise magnitude and frequency—to color values stored in arrays within replay (and intermediate) frames across a sequence of replay frames, such as a common sinusoidal noise signal to each color component or unique sinusoidal noise signals at various magnitudes, frequencies, and/or phases to the color components of light elements in the light structures. Alternatively, the computer system can implement a pseudorandom noise generator and noise magnitude cap (e.g., a magnitude cap of "10" for an eight-bit color value) to (severely or subtly) adjust color values in arrays across a sequence of replay frames served to the assembly light structures. By executing arrays injected with noise, light structures in a light structure assembly can output light that "flickers" through colors around original colors specified in the original light pattern, which may be perceived by an onlooker as greater color depth.

However, the computer system can implement any other method or technique to intentionally inject noise into arrays served to light structures.

15.3 Low Color Brightnesses

In another implementation, the computer system can implement and adjust color values across a sequence of arrays served to a light structure in order to achieve greater perceived brightness resolution at low color brightnesses.

In one example, the computer system can generate and output arrays containing 8-bit color values. In this example, upon receipt of a new array from the computer system, a local controller connected to a particular light element can read an assigned color value of [25, 25, 25] from this new array and interpret this color value as a callout for 10% brightness (i.e., "25/255") at each of the red, green, and blue components in its corresponding light element. The local controller in the light structure can then pulse-width-modulate ("PWM") power signals supplied to these red, green, and blue components at 10% duty, such as at a static PWM rate of 2 kHz. In this example, for the system that implements a frame rate of 200 Hz, the local controller will update a state of the red, green, and blue components in its corresponding light elements ten times before a next array is received from the computer system. To achieve 10% duty at the red, green, and blue components in the particular light element, the local controller can thus activate these red, green, and blue components once in the ten PWM cycles preceding receipt of a next array from the computer system, which may be perceived by an onlooker as "white" light at approximately 10% brightness for this replay frame.

However, if the local controller reads a color value of [5, 5, 5] in a next array received from the computer system, the local controller can interpret this color value as 2% brightness (i.e., "5/255") for each of the red, green, and blue components in its corresponding light element. By implementing this [5, 5, 5] color value directly to achieve 2% duty at the red, green, and blue components in the particular light element at the frame rate set of 200 Hz, the local controller may activate these red, green, and blue components once or never in ten PWM cycles before a next array is received from the computer system. The local controller may therefore be unable to reliably achieve such low color brightness targets by executing a single array specifying such low color brightness—that is, for color values less than "25" or 10% brightness for a PWM rate of 2 kHz and a frame rate of 200 Hz.

Therefore, rather than serve arrays containing [5, 5, 5] color values for the particular light element to achieve perception of white light at 2% brightness at the particular light element, the computer system can generate and serve a sequence of arrays that—in aggregate—yield a color brightness specified in a light pattern, as described above. For example, to achieve 2% color brightness at a particular light element over a period of booms given a frame rate of 200 Hz and a PWM frequency of 2 kHz, the computer system can output a sequence of 100 arrays to the light structure containing the particular light element. In this example, the computer system can pair a set of four arrays containing a [0, 0, 0] (or "full off") color value for the particular light element with one array containing a [25, 25, 25] (or "10% brightness") color value for the particular light element; these 100 arrays can include twenty such sequences. When the particular light executes color values in these 100 arrays in sequence over a period of 500 ms, an onlooker may perceive "white" light at approximately 2% brightness from the particular light element over this period of time.

The computer system can therefore implement second order-PWM techniques to modulate a color value assigned to a particular light element over a sequence of arrays in order to more accurately achieve a low color brightness at the particular light element based on a frame rate of the system and a PWM frequency implemented by local controllers within the light structures.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automatically mapping light elements in a set of light structures arranged in an assembly, the method comprising:

serving a sequence of test frames to the assembly for execution by the set of light structures, each test frame in the sequence of frames executable by the set of light structures and specifying activation of a subset of light elements within the set of light structures;

receiving a set of optical test images of the assembly, each optical test image in the set of optical test images recorded by an imaging system during execution of one test frame, in the sequence of test frames, by the set of light structures;

for each optical test image in the set of optical test images, detecting a location of a particular light element within a field of view of the imaging system based on a local change in light level represented in the optical test image, the particular light element activated within the set of light structures according to a test frame in the sequence of test frames executed by the assembly during recordation of the optical test image; and aggregating locations of light elements detected in the set of optical test images into a virtual map representing positions of light elements within the assembly.

2. The method of claim 1:

wherein aggregating locations of light elements detected in the set of optical test images into the virtual map comprises populating the virtual map with a set of points in a three-dimensional virtual space, each point in the set of points representing a position of a corresponding light element within the assembly; and further comprising, for each point in the set of points within the virtual map, associating the point with a subaddress of a corresponding light element within a particular light structure in the set of light structures within the assembly.

3. The method of claim 2, further comprising:
mapping a predefined dynamic light pattern onto points in the virtual map;
generating a sequence of replay frames, each replay frame in the sequence of replay frames assigning a color value to a subaddress of each light element within the assembly according to a three-dimensional color pattern defined at one instance within a duration of the predefined dynamic light pattern; and
serving the sequence of replay frames to the assembly for execution.

4. The method of claim 1:
further comprising:
generating a baseline frame specifying deactivation of all light elements within the assembly;
serving the baseline frame to the assembly for execution by the set of light structures prior to the sequence of test frames; and
receiving an optical baseline image of the assembly, the optical baseline image recorded by the imaging system during execution of the baseline frame by the set of light structures;
wherein detecting a location of a particular light element within the field of view of the imaging system for each optical test image in the set of optical test images comprises, for each optical test image in the set of optical test images:
calculating a difference image between the optical baseline image and the optical test image;
calculating a centroid of a region remaining in the difference image; and
storing the centroid as the location of the particular light element within the field of view of the imaging system.

5. The method of claim 1, wherein serving the sequence of test frames to the assembly and receiving the set of optical test images of the assembly comprise:
serving a first test frame, in the sequence of test frames, to the assembly, the first test frame specifying activation of a first unique subset of light elements within the set of light structures;
triggering the imaging system to record a first optical test image in the set of optical test images;
in response to receipt of the first optical test image, serving a second test frame, in the sequence of test frames, to the assembly, the second test frame specifying activation of a second unique subset of light elements within the set of light structures;
triggering the imaging system to record a second optical test image in the set of optical test images; and
in response to receipt of the second optical test image, serving a third test frame, in the sequence of test frames, to the assembly, the third test frame specifying activation of a third unique subset of light elements within the set of light structures.

6. The method of claim 1:
further comprising:
generating a baseline frame specifying deactivation of light elements in light structures within the assembly;
serving the baseline frame to the assembly for execution;
receiving an optical baseline image recorded by the imaging system during execution of the baseline frame at the assembly;
wherein receiving the set of optical test images of the assembly and detecting a location of a particular light element within the field of view of the imaging system for each optical test image in the set of optical test images comprise:
for a first frame in the sequence of test frames:
receiving a first optical test image, in the set of optical test images, recorded by the imaging system during execution of the first test frame by the assembly, the first test frame specifying activation of a first light element in a first light structure within the assembly;
detecting a first location of the first light element within a field of view of the imaging system based on a difference between the first optical test image and the optical baseline image;
for a second frame in the sequence of test frames:
receiving a second optical test image, in the set of optical test images, recorded by the imaging system during execution of the second test frame by the assembly, the second test frame specifying activation of a second light element in the first light structure;
detecting a second location of the second light element within the field of view of the imaging system based on a difference between the second optical test image and the optical baseline image;
retrieving a first three-dimensional virtual model of the first light structure based on an address of the first light structure, the first three-dimensional virtual model defining a geometry and locations of light elements within the first light structure;
aligning a first point representing the first light element within the first three-dimensional virtual model to the first location;
aligning a second point representing the second light element within the first three-dimensional virtual model to the second location; and
populating the virtual map with points from the virtual model representing light elements in the first light structure.

7. The method of claim 1, further comprising:
receiving an address from each light structure within the assembly;
accessing a configuration of each light structure within the assembly based on the address of each light structure within the assembly; and
defining the sequence of test frames executable by the set of light structures based on the configuration of each light structure within the assembly.

8. The method of claim 7:
wherein defining the sequence of test frames comprises defining the sequence of test frames, each test frame in the sequence of test frames comprising a set of numerical arrays, each numerical array in the set of numerical arrays assigned to an address of a particular light structure within the assembly and comprising a sequence of color values corresponding to an ordered series of light elements in the particular light structure; and
wherein serving the sequence of test frames to the assembly comprises, for each test frame in the sequence of test frames, distributing an array in the test frame to a corresponding light structure within the assembly.

9. The method of claim 7:
wherein defining the sequence of test frames comprises:
defining a first test frame comprising a first set of numerical arrays, specifying activation of a first light element in a first light structure within the assembly, and specifying deactivation of remaining light elements in light structures within the assembly; and defining a second test frame comprising a second set of numerical arrays, specifying activation of a second light element in a second light structure within the assembly, and specifying deactivation of remaining light elements in light structures within the assembly;

wherein serving the sequence of test frames to the assembly for execution by the set of light structures comprises:

at a first time, serving the first test frame to the assembly for execution by the set of light structures to activate the first light element in the first light structure; and at a second time succeeding the first time, serving the second test frame to the assembly for execution by the set of light structures to activate the second light element in the second light structure;

wherein receiving the set of optical test images of the assembly comprises:

receiving a first optical test image of the assembly recorded by the imaging system at approximately the first time; and receiving a second optical test image of the assembly recorded by the imaging system at approximately the second time.

10. A method for automatically mapping light elements in a set of light structures arranged in an assembly, the method comprising:

serving a sequence of test frames to the assembly for execution by the set of light structures, each test frame in the sequence of frames executable by the set of light structures and specifying activation of a subset of light elements within the set of light structures;

receiving a set of optical test images of the assembly, the set of optical test images recorded by an imaging system during execution of the sequence of test frames by the set of light structures;

detecting locations of light elements within a field of view of the imaging system based on local changes in light levels detected in the set of optical test images; and aggregating locations of light elements detected in the set of optical test images into a virtual map representing positions of light elements within the assembly.

11. The method of claim 10:

wherein receiving the set of optical test images of the assembly comprises receiving the set of optical test images of the assembly recorded by the imaging system occupying a first position during execution of the sequence of test frames by the set of light structures over a first period of time;

further comprising serving a second sequence of test frames to the assembly for execution by the set of light structures, each test frame in the second sequence of frames specifying activation of a subset of light elements within the set of light structures;

further comprising receiving a second set of optical test images of the assembly recorded by the imaging system occupying a second position during execution of the second sequence of test frames by the set of light structures over a second period of time;

wherein detecting locations of light elements within a field of view of the imaging system comprises:

for each optical test image in the set of optical test images, detecting a location of a particular light element within a field of view of the imaging system based on a local change in light level represented in the optical test image, the particular light element activated within the set of light structures according to a test frame in the sequence of test frames executed by the assembly during recordation of the optical test image; and for each optical test image in the second set of optical test images, detecting a second location of a particular light element within a field of view of the imaging system based on a local change in light level represented in the optical test image, the particular light element activated within the set of light structures according to a test frame in the second sequence of test frames executed by the assembly during recordation of the optical test image; and wherein aggregating locations of light elements detected in the set of optical test images into the virtual map comprises merging locations of light elements detected in the set of optical images and locations of light elements detected in the second set of optical images into a virtual three-dimensional map of the light elements in light structures within the assembly based on a difference between the first position and the second position.

12. The method of claim 10, further comprising:

receiving an address from each light structure within the assembly;

accessing a configuration of each light structure within the assembly based on the address of each light structure within the assembly; and defining a sequence of test frames executable by the set of light structures based on the configuration of each light structure within the assembly, each test frame in the sequence of test frames specifying activation of a unique subset of light elements in light structures within the assembly.

13. The method of claim 10:

wherein aggregating locations of light elements detected in the set of optical test images into the virtual map comprises populating the virtual map with a set of points in a three-dimensional virtual space, each point in the set of points representing a position of a corresponding light element within the assembly; and further comprising, for each point in the set of points within the virtual map, associating the point with a subaddress of a corresponding light element within a particular light structure in the set of light structures within the assembly.

14. The method of claim 10, further comprising:

projecting a virtual dynamic three-dimensional light pattern onto the virtual map;

generating a sequence of replay frames executable by the assembly to recreate the virtual dynamic three-dimensional light pattern in real space; and serving the sequence of replay frames to the assembly for execution by the set of light structures.

15. The method of claim 14:

wherein aggregating locations of light elements detected in the set of optical test images into the virtual map comprises generating the virtual map comprising a three-dimensional point cloud representing positions of light elements within the assembly;

further comprising accessing a parameterized dynamic light pattern defining a virtual volume of color that changes in color value and color intensity as a function of time;

wherein projecting a virtual dynamic three-dimensional light pattern onto the virtual map comprises:
  scaling the dynamic light pattern onto the virtual map of the assembly; and
  associating each point in the virtual map with a discrete virtual subvolume in the virtual volume of color of the dynamic light pattern;
wherein generating the sequence of replay frames comprises:
  for each point in the virtual map, populating a first replay frame, in the sequence of replay frames, with a color value of a subvolume of the virtual volume of color corresponding to the point for a first temporal instance of the dynamic light pattern; and
  for each point in the virtual map, populating a second replay frame, in the sequence of replay frames, with a color value of a subvolume of the virtual volume of color corresponding to the point for a second temporal instance of the dynamic light pattern.

16. The method of claim 10, further comprising:
generating a graph of nearest light elements within the assembly represented in the virtual map;
selecting a start light element represented in the virtual map;
selecting an end light element represented in the virtual map; and
generating a sequence of replay frames executable by the assembly in sequence over a replay period to illuminate an animated chain of light elements from the first light element within the assembly to the end light element within the assembly.

17. The method of claim 10:
further comprising:
  receiving an address from each light structure within the assembly; and
  for each light structure within the assembly, retrieving a three-dimensional virtual model of the light structure based on an address of the light structure, the three-dimensional virtual model comprising a set of points representing three-dimensional locations of light elements within the light structure; and
wherein aggregating locations of light elements detected in the set of optical test images into the virtual map comprises:
  calculating a first transform that aligns a subset of points in a first three-dimensional virtual model of a first light structure within the assembly to locations of a corresponding subset of light elements detected in a first subset of optical test images in the set of optical test images recorded during execution of a subset of the sequence of test frames specifying activation of the corresponding subset of light elements in the first light structure; and
  importing a first set of points in the first three-dimensional virtual model into a three-dimensional virtual space according to the first transform to represent locations of light elements in the first light structure in real space.

18. The method of claim 17, further comprising:
rendering the three-dimensional virtual model for each light structure within the assembly in a holding area within a graphical user interface; and
in response to calculating the first transform, rendering an animation of the first three-dimensional virtual model moving from the holding area into a first position within a three-dimensional virtual space rendered adjacent the holding area within the graphical user interface, the first position within the three-dimensional virtual space defined according to the first transform and representing a real position of the first light structure in real space.

19. The method of claim 10:
wherein aggregating locations of light elements into the virtual map comprises representing a three-dimensional geometry of each light structure within the assembly in the virtual map; and
further comprising:
  detecting an intersection between three-dimensional geometries of a first light structure and a second light structure in the virtual map; and
  in response to detecting the intersection:
    generating a sequence of check frames specifying activation of light elements in the first light structure and the second light structure;
    serving the sequence of check frames to the assembly for execution; and
    serving a prompt through a user interface to adjust positions of the three-dimensional geometries of the first light structure and the second light structure in the virtual map.

20. The method of claim 10:
further comprising:
  generating a baseline frame specifying deactivation of all light elements within the assembly;
  serving the baseline frame to the assembly for execution by the set of light structures prior to the sequence of test frames; and
  receiving an optical baseline image of the assembly, the optical baseline image recorded by the imaging system during execution of the baseline frame by the set of light structures;
wherein detecting locations of light elements within the field of view of the imaging system comprises, for each optical test image in the set of optical test images:
  calculating a difference image between the optical baseline image and the optical test image;
  calculating a centroid of a region remaining in the difference image; and
  storing the centroid as the location of the particular light element within the field of view of the imaging system.

* * * * *

UNITED STATES PATENT AND TRADEMARK OFFICE
CERTIFICATE OF CORRECTION

PATENT NO. : 10,237,957 B2  
APPLICATION NO. : 15/909688  
DATED : March 19, 2019  
INVENTOR(S) : Green et al.

Page 1 of 1

It is certified that error appears in the above-identified patent and that said Letters Patent is hereby corrected as shown below:

On the Title Page

Column 1, item (72), after "Kyle Fleming, San Francisco CA (US)" add inventor "Bruce Thomas Vest III, San Francisco, CA (US)"

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*